United States Patent
Sato et al.

(10) Patent No.: US 6,901,651 B2
(45) Date of Patent: Jun. 7, 2005

(54) METHOD OF MANUFACTURING THIN-FILM MAGNETIC HEAD

(75) Inventors: Yoshikazu Sato, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 527 days.

(21) Appl. No.: 09/985,610

(22) Filed: Nov. 5, 2001

(65) Prior Publication Data

US 2002/0078552 A1 Jun. 27, 2002

(30) Foreign Application Priority Data

Nov. 10, 2000 (JP) ........................................ 2000-343245
Nov. 10, 2000 (JP) ........................................ 2000-344507
May 14, 2001 (JP) ........................................ 2001-142686

(51) Int. Cl.[7] ............................. G11B 5/187; C25D 5/02
(52) U.S. Cl. .................................. 29/603.07; 29/603.12; 29/603.14; 29/603.15; 29/603.16; 360/122; 360/125; 205/119; 205/122
(58) Field of Search ........................ 29/603.07, 603.23, 29/603.25, 603.12, 603.13, 603.14, 603.15, 603.16; 360/122, 123, 125; 205/118, 119, 122

(56) References Cited

U.S. PATENT DOCUMENTS

| | | | | |
|---|---|---|---|---|
| 5,141,623 A | * | 8/1992 | Cohen et al. | 205/122 |
| 5,516,418 A | * | 5/1996 | Doss et al. | 205/119 |
| 5,901,431 A | * | 5/1999 | Santini | 29/603.14 |

FOREIGN PATENT DOCUMENTS

| | | | |
|---|---|---|---|
| JP | 6-28626 | * | 2/1994 |
| JP | A 11-102506 | | 4/1999 |
| JP | A 2000-57522 | | 2/2000 |
| JP | A 2000-67413 | | 3/2000 |

OTHER PUBLICATIONS

"Head/Media Las Vegas 2000—Show Directory", Nov. 11–12, 2000.

* cited by examiner

Primary Examiner—A. Dexter Tugbang
(74) Attorney, Agent, or Firm—Oliff & Berridge, PLC

(57) ABSTRACT

A manufacturing method in which a second magnetic layer of a thin-film magnetic head includes the steps of: forming a pole portion layer; forming a protective layer so as to cover a part of the pole portion layer located near the medium facing surface ABS; forming an electrode layer to be used as an electrode when forming a yoke portion layer by electroplating; forming the yoke portion layer by electroplating on the electrode layer using the electrode layer as an electrode; and removing an unnecessary portion of the electrode layer.

10 Claims, 38 Drawing Sheets

METHOD OF MANUFACTURING THIN-FILM MAGNETIC HEAD

BACKGROUND OF THE INVENTION

1. Field of the Invention

The present invention relates to a method of manufacturing a thin-film magnetic head having at least an induction-type electromagnetic transducer for write operations.

2. Description of the Related Art

The recording schemes for a magnetic read/write apparatus include a longitudinal magnetic recording scheme which employs the direction of signal magnetization along the surface of the recording medium (or in the longitudinal direction) and a vertical magnetic recording scheme which employs the direction of signal magnetization perpendicular to the surface of the recording medium. When compared with the longitudinal magnetic recording scheme, the vertical magnetic recording scheme is said to be less affected by the thermal fluctuation of a recording medium and therefore possible to implement a higher linear recording density.

In general, the thin-film magnetic head that employs the longitudinal magnetic recording scheme comprises: a medium facing surface (or air bearing surface) that faces toward a recording medium; a first magnetic layer and a second magnetic layer magnetically coupled to each other and including magnetic pole portions that are opposed to each other and placed in regions of the magnetic layers on a side of the medium facing surface, with a gap layer provided between the pole portions; and a thin-film coil at least a part of which is placed between the first and second magnetic layers and insulated from the first and second magnetic layers.

On the other hand, examples of the thin-film magnetic head that employs the vertical magnetic recording scheme include a ring head having the same structure as that of the thin-film magnetic head that employs the longitudinal magnetic recording scheme, and a single magnetic pole head for applying a magnetic field in a direction perpendicular to the surface of the recording medium with one main magnetic pole. Generally, for the single magnetic pole head, used as a recording medium is a two-layer medium that has a soft magnetic layer and a magnetic recording layer stacked on a substrate.

With a recent trend toward higher recording density, reduction in track width has been desired for thin-film magnetic heads. In this connection, reduction in the width of a magnetic pole that defines the track width has also been desired for thin-film magnetic heads which operates on either of the longitudinal magnetic recording scheme and the vertical magnetic recording scheme. Conventionally, however, there have been two problems which make it difficult to reduce the width of the main magnetic pole.

A first problem is that it is difficult to pattern the magnetic pole with high accuracy, for example, such that the magnetic pole would have a width of 0.5 $\mu$m or less. That is, a magnetic layer including a magnetic pole portion is formed by electroplating (or frame plating), for example, through the use of a resist frame formed by photolithography. However, since the magnetic layer including the magnetic pole portion is formed on a raised portion of an insulating layer that covers the coil, and therefore, the resist frame is formed on the insulating layer that has great differences in height of irregularities. In this case, since the resist cannot be readily formed in a uniform thickness, it is difficult to pattern the resist frame with accuracy. This in turn makes it difficult to accurately pattern the magnetic layer including the magnetic pole portion.

A second problem is that a reduction in width of the magnetic pole causes a magnetic flux to be saturated before the flux reaches the tip of the magnetic pole, thereby causing a reduction in the magnetic field generated from the tip of the magnetic pole in the medium facing surface.

To overcome the aforementioned problems, a thin-film magnetic head for use with the longitudinal magnetic recording scheme often employs a structure in which one magnetic layer is divided into a pole portion layer and a yoke portion layer. The pole portion layer includes a magnetic pole portion exposed in the medium facing surface, and the width of the pole portion layer measured in the medium facing surface defines a track width. The yoke portion layer introduces a magnetic flux into the pole portion layer. If this structure is employed, by forming the pole portion layer to have a saturated magnetic flux density greater than that of the yoke portion layer, it is possible to efficiently introduce the magnetic flux to the tip of the magnetic pole portion, and to form the magnetic pole portion to have a small width. Examples of the thin-film magnetic head having such a structure are disclosed in Published Unexamined Japanese Patent Application (KOKAI) Nos. 11-102506, 2000-57522, and 2000-67413.

Accordingly, it has been proposed for the single magnetic pole heads for use with the vertical magnetic recording scheme, too, to employ such a structure in which the main magnetic pole is divided into the pole portion layer and the yoke portion layer.

In the thin-film magnetic head having the structure in which the magnetic layer for defining a track width is divided into the pole portion layer and the yoke portion layer, it is preferable that the yoke portion layer should have a uniform thickness so as to efficiently introduce a magnetic flux. For that reason, it is preferable to form the yoke portion layer by electroplating. To form the yoke portion layer by electroplating, it is necessary to form an electrode layer on the surface of a base of the yoke portion layer prior to the plating because most of the base is an insulator. In general, a sputtering method is employed to form the electrode layer. After the plating has been carried out, it is necessary to remove an unnecessary portion of the electrode layer that is other than a portion underlying the yoke portion layer.

In general, the yoke portion layer is formed after the pole portion layer has been formed, so as to be connected to the pole portion layer. For this reason, in the case of forming the electrode layer by sputtering, the electrode layer is formed not only on the interface between the pole portion layer and the yoke portion layer but also on a portion of the pole portion layer near the medium facing surface. The electrode layer that has been formed on a portion of the pole portion layer near the medium facing surface is removed after the yoke portion layer has been formed. In this connection, there has been a problem in that when removing the electrode layer, the pole portion layer may deformed or damaged, which can result in deterioration in property.

Moreover, in the case of forming the electrode layer by sputtering, the electrode layer is formed also on both side surfaces of the pole portion layer near the medium facing surface. It is difficult to remove the electrode layer that has been formed on the side surfaces. If part of the electrode layer remains on the side surfaces, a magnetic flux can flow into the recording medium from this part of the electrode layer, too, which can result in an increase in the effective track width, to thereby make it difficult to reduce the track width.

OBJECT AND SUMMARY OF THE INVENTION

It is therefore an object of the invention to provide a method of manufacturing a thin-film magnetic head in which a magnetic layer that defines a track width has a pole portion layer and a yoke portion layer. According to the method, it is possible to prevent the pole portion layer from being deformed or damaged when removing an unnecessary portion of an electrode layer used for forming the yoke portion layer by electroplating, and to prevent the electrode layer from causing an increase in the effective track width.

A method of the invention is provided for manufacturing a thin-film magnetic head comprising: a medium facing surface that faces toward a recording medium; a coil that generates a magnetic field associated with information to be written on the recording medium; and a magnetic layer that defines a track width, allows a magnetic flux to pass therethrough, the magnetic flux corresponding to the magnetic field generated by the coil, and generates a magnetic field for writing the information on the recording medium, wherein the magnetic layer has: a pole portion layer that has one end exposed in the medium facing surface and generates the magnetic field for writing the information on the recording medium from the one end, the width of the one end defining a track width; and a yoke portion layer that is not exposed in the medium facing surface, is magnetically connected to the pole portion layer and introduces the magnetic flux corresponding to the magnetic field generated by the coil into the pole portion layer. The method comprises the steps of forming the coil and forming the magnetic layer. The step of forming the magnetic layer includes the steps of:

forming the pole portion layer;

forming a protective layer so as to cover a part of the pole portion layer, the part being located near the one end;

forming an electrode layer to be used as an electrode when forming the yoke portion layer by electroplating, so as to cover the pole portion layer and the protective layer;

forming the yoke portion layer on the electrode layer by electroplating, using the electrode layer as an electrode; and removing an unnecessary portion of the electrode layer.

In the method of manufacturing a thin-film magnetic head according to the invention, the protective layer is formed so as to cover a part of the pole portion layer, the part being located near the one end of the pole portion layer, before forming the electrode layer to be used as an electrode when forming the yoke portion layer by electroplating. Accordingly, it is possible to prevent the pole portion layer from being deformed or damaged when removing an unnecessary portion of the electrode layer after the yoke portion layer has been formed, and to prevent an increase in the effective track width due to the electrode layer.

In the method of manufacturing a thin-film magnetic head of the invention, the yoke portion layer may be magnetically connected to the pole portion layer in a part of a top surface of the pole portion layer. In this case, the step of forming the magnetic layer may further include, between the step of forming the pole portion layer and the step of forming the protective layer, the steps of: forming a non-magnetic layer around the pole portion layer; and flattening at least the part of the top surface of the pole portion layer in which the yoke portion layer is magnetically connected to the pole portion layer, together with a top surface of the non-magnetic layer, by polishing the non-magnetic layer.

In the method of manufacturing a thin-film magnetic head of the invention, the yoke portion layer may be magnetically connected to the pole portion layer at least in a part of: an end surface of the pole portion layer farther from the medium facing surface; and both side surfaces of the pole portion layer in the width direction.

In the method of manufacturing a thin-film magnetic head of the invention, the step of forming the magnetic layer may further include the step of removing the protective layer after the step of removing the unnecessary portion of the electrode layer.

In the method of manufacturing a thin-film magnetic head of the invention, the unnecessary portion of the electrode layer may be removed by dry etching in the step of removing the unnecessary portion of the electrode layer.

In the method of manufacturing a thin-film magnetic head of the invention, the protective layer may be formed of a photosensitive resist.

In the method of manufacturing a thin-film magnetic head of the invention, at an interface between the protective layer and a base of the protective layer, a plane that is in contact with the surface of the protective layer may form an acute angle with a top surface of the base.

In the method of manufacturing a thin-film magnetic head of the invention, the protective layer may have blunt edges.

In the method of manufacturing a thin-film magnetic head of the invention, the protective layer may define a position of an end of the yoke portion layer closer to the medium facing surface.

Other and further objects, features and advantages of the invention will appear more fully from the following description.

DETAILED DESCRIPTION OF THE PREFERRED EMBODIMENTS

Embodiments of the invention will now be described in detail with reference to the accompanying drawings.

[First Embodiment]

Figure 1:
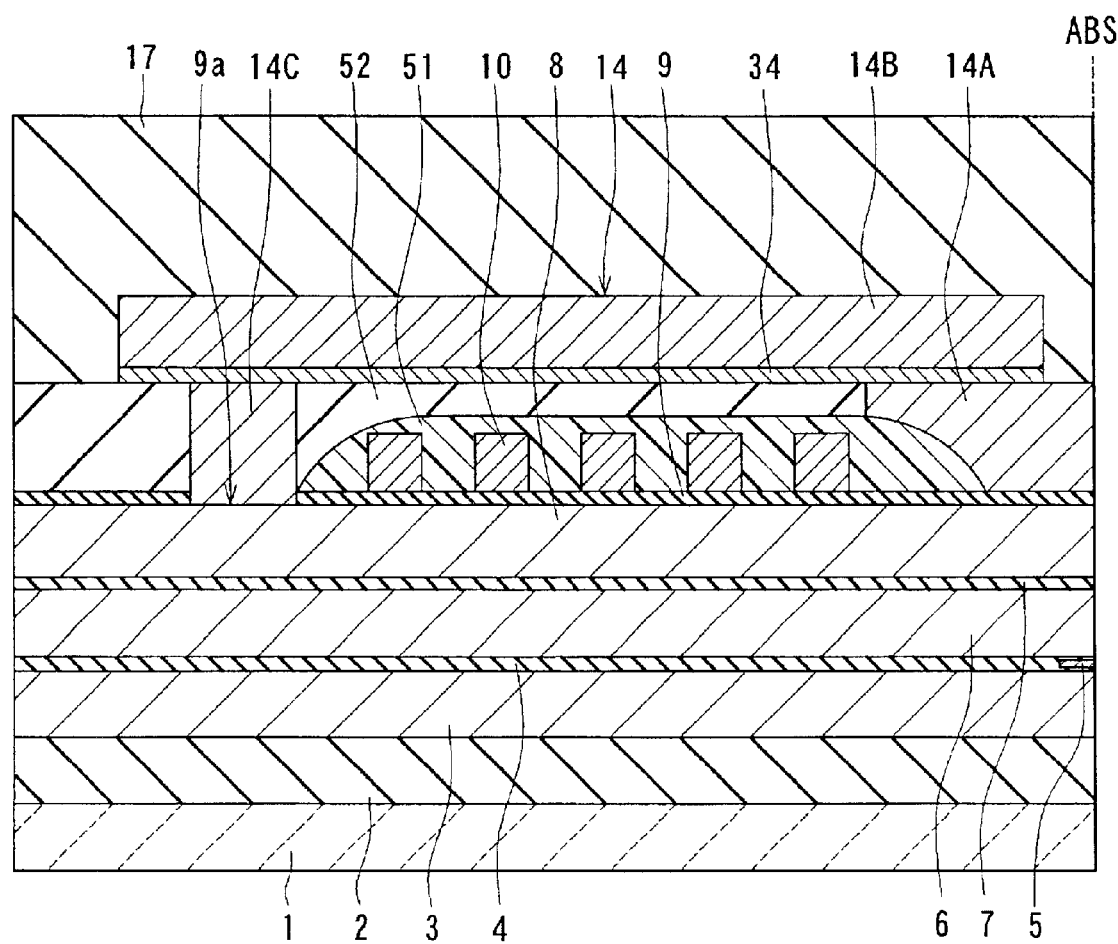
FIG. 1 is a cross-sectional view illustrating a structure of a thin-film magnetic head in a first embodiment of the invention.
Figure 2:
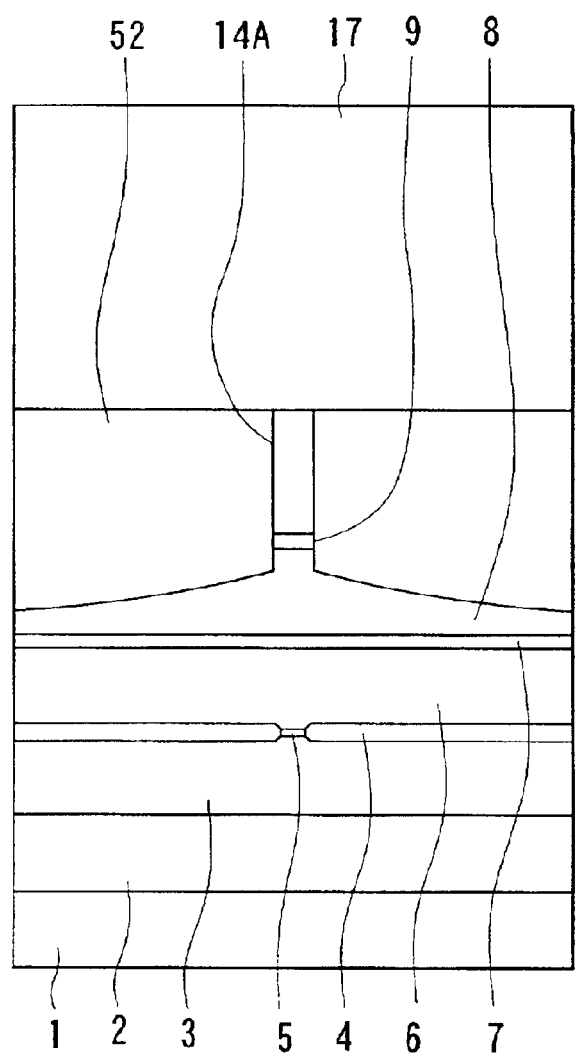
FIG. 2 is a front view illustrating the medium facing surface of the thin-film magnetic head shown in FIG. 1.

To begin with, referring to FIGS. 1 and 2, explained is the structure of a thin-film magnetic head to which a method of manufacturing a thin-film magnetic head according to a first embodiment of the invention is applied. The thin-film magnetic head in this embodiment is suitable for use with the longitudinal magnetic recording scheme. FIG. 1 is a cross-sectional view illustrating the structure of the thin-film magnetic head in this embodiment. FIG. 1 is a cross section orthogonal to the medium facing surface and the surface of the substrate. FIG. 2 is a front view illustrating the medium facing surface of the thin-film magnetic head shown in FIG. 1.

As shown in FIGS. 1 and 2, the thin-film magnetic head in this embodiment comprises: a substrate 1 made of a ceramic material such as aluminum oxide and titanium carbide ($Al_2O_3.TiC$); an insulating layer 2 made of an insulating material such as alumina ($Al_2O_3$) and formed on the substrate 1; a bottom shield layer 3 made of a magnetic material and formed on the insulating layer 2; an MR (magnetoresistive) element 5 functioning as a read element and formed on the bottom shield layer 3 via an insulating layer 4; and a top shield layer 6 made of a magnetic material and formed on the MR element 5 via the insulating layer 4. Each of the bottom shield layer 3 and the top shield layer 6 has a thickness of, for example, 1 to 2 μm.

One of ends of the MR element 5 is located in the medium facing surface (air bearing surface) ABS. The MR element 5 may be an element made of a magnetosensitive film that exhibits a magnetoresistive effect, such as an anisotropic magnetoresistive (AMR) element, a giant magnetoresistive (GMR) element, or a tunneling magnetoresistive (TMR) element.

The thin-film magnetic head further comprises: a non-magnetic layer 7 formed on the top shield layer 6; a first magnetic layer 8 made of a magnetic material and formed on the non-magnetic layer 7; a gap layer 9 formed on the first magnetic layer 8; a thin-film coil 10 formed on the gap layer 9; and an insulating layer 51 that covers the thin-film coil 10. An end of the insulating layer 51 closer to the medium facing surface ABS is not exposed in the medium facing surface ABS and defines a throat height. The throat height is defined as the length (or height) of a portion over which the first magnetic layer 8 and a second magnetic layer 14, described later, face each other via the gap layer 9 and which extends from one end of the portion closer to the medium facing surface ABS to the other end. There is formed a contact hole 9a in the gap layer 9 at a distance from the medium facing surface ABS.

The first magnetic layer 8 is 1 to 2 μm in thickness. For example, the magnetic material for making the first magnetic layer 8 may be an iron-nickel-based alloy or Permalloy, or a high saturated magnetic flux density material as described later. The first magnetic layer 8 may be made up of two or more layers.

For example, the gap layer 9 is made of a non-conductive and non-magnetic material such as alumina, and has a thickness of 0.05 to 2 μm, for example.

The thin-film coil 10 is made of a conductive material such as copper, and the winding thereof is 0.3 to 2 μm in thickness, for example. Thin-film coil 10 can have any number of turns of the winding as well as any pitch of the winding.

The insulating layer 51 is made of a non-conductive and non-magnetic material that exhibits fluidity during its formation. More specifically, the insulating layer 51 may be formed of an organic, non-conductive and non-magnetic material such as a photosensitive resist (photoresist), or a spin-on-glass (SOG) film of coating glass.

The thin-film magnetic head further comprises a pole portion layer 14A having an end which is exposed in the medium facing surface ABS, the width of this end defining a track width. The pole portion layer 14A generates, from this end, a magnetic field for writing information on a recording medium. The pole portion layer 14A is formed on the gap layer 9. As shown in FIG. 1, a part of the pole portion layer 14A farther from the medium facing surface ABS preferably sits on the insulating layer 51. When measured in the medium facing surface ABS, the pole portion layer 14A has a thickness of 3 μm or more and a width of 0.5 μm or less, for example.

The thin-film magnetic head further comprises: a coupling portion 14C made of a magnetic material and formed on a portion of the first magnetic layer 8 in which the contact hole 9a is formed; and a non-magnetic layer 52 that covers the gap layer 9 and the insulating layer 51, and is disposed around the pole portion layer 14A and the coupling portion 14C. The thin-film coil 10 is wound around the coupling portion 14C.

For example, the coupling portion 14C has a thickness of 3 μm, a depth (or the length perpendicular to the medium facing surface ABS) of 2 to 10 μm, and a width of 5 to 20 μm. For example, the magnetic material for making the coupling portion 14C may be an iron-nickel-based alloy or Permalloy, or a high saturated magnetic flux density material as described later. The non-magnetic layer 52 is formed of a non-conductive and non-magnetic material such as alumina. The top surfaces of the pole portion layer 14A, the coupling portion 14C, and the non-magnetic layer 52 are flattened.

The thin-film magnetic head further comprises a yoke portion layer 14B that is formed on the flattened pole portion layer 14A, coupling portion 14C and non-magnetic layer 52 via an electrode layer 34, and magnetically couples the pole portion layer 14A and the coupling portion 14C to each other. The pole portion layer 14A, the yoke portion layer 14B, and the coupling portion 14C constitute the second magnetic layer 14. An end of the yoke portion layer 14B closer to the medium facing surface ABS is not exposed in the medium facing surface ABS. The yoke portion layer 14B is magnetically connected to the pole portion layer 14A in a part of the top surface of the pole portion layer 14A. The yoke portion layer 14B is formed by electroplating. The electrode layer 34 is used as an electrode when forming the yoke portion layer 14B by electroplating.

The thin-film magnetic head further comprises a protective layer 17 made of a non-conductive and non-magnetic material such as alumina and formed to cover the second magnetic layer 14.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe—M (including oxygen atoms as required), and Fe—CO—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

As described above, the thin-film magnetic head in this embodiment comprises the medium facing surface ABS that faces toward the recording medium, a read head, and a write head (induction-type electromagnetic transducer). The read head comprises the MR element 5 functioning as a read element, and the bottom shield layer 3 and the top shield layer 6 for shielding the MR element 5. The bottom and top shield layers 3 and 6 have portions that are located on a side of the medium facing surface ABS and opposed to each other with the MR element 5 interposed therebetween.

The write head comprises: the first magnetic layer 8 and the second magnetic layer 14 that are magnetically coupled to each other at a distance from the medium facing surface ABS, and include magnetic pole portions disposed on a side of the medium facing surface ABS so as to oppose to each other with a predetermined spacing interposed therebetween; the gap layer 9 made of a non-magnetic material and provided between the magnetic pole portion of the first magnetic layer 8 and the magnetic pole portion of the second magnetic layer 14; and the thin-film coil 10 at least a part of which is disposed between the first magnetic layer 8 and the second magnetic layer 14 and insulated from those magnetic layers 8 and 14. The thin-film coil 10 generates a magnetic field associated with information to be written on the recording medium.

The second magnetic layer 14 defines a track width, allows a magnetic flux to pass therethrough, the magnetic flux corresponding to the magnetic field generated by the thin-film coil 10, and generates a magnetic field for writing the information on the recording medium. The second magnetic layer 14 comprises: the pole portion layer 14A that has an end exposed in the medium facing surface ABS and generates the magnetic field for writing the information on the recording medium from this end, the width of this end defining a track width; the yoke portion layer 14B that is not exposed in the medium facing surface ABS, that is magnetically connected to the pole portion layer 14A and introduces the magnetic flux corresponding to the magnetic field generated by the thin-film coil 10 into the pole portion layer 14A; and the coupling portion 14C that magnetically couples the yoke portion layer 14B and the first magnetic layer 8 to each other. The pole portion layer 14A has a saturated magnetic flux density equal to or greater than that of the yoke portion layer 14B.

According to the thin-film magnetic head in this embodiment, the second magnetic layer 14 has the pole portion layer 14A and the yoke portion layer 14B. This makes it possible to reduce the track width without decreasing the intensity of the magnetic field to be applied to the recording medium.

According to the thin-film magnetic head in this embodiment, the second magnetic layer 14 has the pole portion layer 14A and the yoke portion layer 14B, wherein the yoke portion layer 14B has a volume sufficient to introduce the magnetic flux into the pole portion layer 14A, and the pole portion layer 14A has a saturated magnetic flux density equal to or greater than that of the yoke portion layer 14B. It is therefore possible to prevent the magnetic flux from being saturated halfway through the second magnetic layer 14.

Now, referring to FIGS. 3 to 12, a method of manufacturing the thin-film magnetic head according to this embodiment is explained below.

According to the method of manufacturing the thin-film magnetic head of this embodiment, the insulating layer 2 is first formed on the substrate 1. Then, the bottom shield layer 3 is formed on the insulating layer 2. Then, an insulating film to be a part of the insulating layer 4 is formed on the bottom shield layer 3. On this insulating film, formed are the MR element 5 and leads (not shown) to be connected to the MR element 5. Then, the MR element 5 and the leads are covered with another insulating film that makes the other part of the insulating layer 4, and the MR element 5 and the leads are embedded in the insulating layer 4.

Then, the top shield layer 6 is formed on the insulating layer 4, and the non-magnetic layer 7 is formed on the top shield layer 6. Then, on the non-magnetic layer 7, the first magnetic layer 8 is formed into a predetermined shape. Then, although not shown, the non-magnetic layer 7 and the first magnetic layer 8 are covered with a non-magnetic material such as alumina. The non-magnetic material is then polished to expose the first magnetic layer 8, and the top surface of the first magnetic layer 8 is flattened. The substrate 1 to the non-magnetic layer 7 are omitted in FIGS. 3 to 12.

Figure 3:
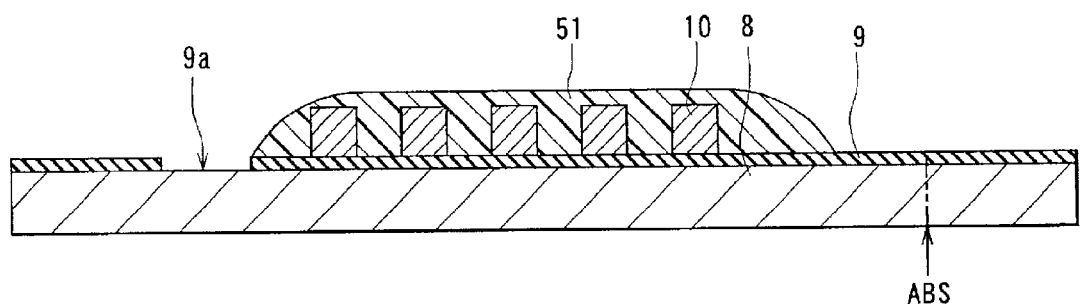
FIG. 3 is a cross-sectional view illustrating a step of a method of manufacturing the thin-film magnetic head according to the first embodiment of the invention.

Then, as shown in FIG. 3, a non-conductive and non-magnetic material such as alumina is sputtered onto the first magnetic layer 8 to form the gap layer 9. Subsequently, through the use of a well-known photolithography technique and dry etching, the contact hole 9a is formed in the gap layer 9 where the coupling portion 14C is to be formed. Then, the thin-film coil 10 is formed on the gap layer 9 with a well-known photolithography technique and a well-known deposition technique (e.g., electroplating). The insulating layer 51 is then formed so as to cover the thin-film coil 10 with a well-known photolithography technique.

Figure 4:
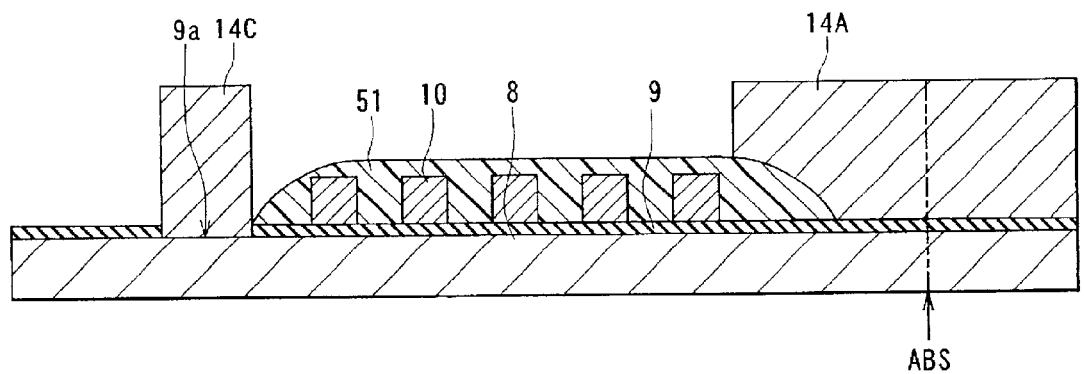
FIG. 4 is a cross-sectional view illustrating a step that follows FIG. 3.

Then, as shown in FIG. 4, with a well-known photolithography technique and a well-known deposition technique (e.g., electroplating or sputtering), the pole portion layer 14A is formed on the gap layer 9 and the coupling portion 14C is formed on the first magnetic layer 8 where the contact hole 9a is formed.

Figure 5:
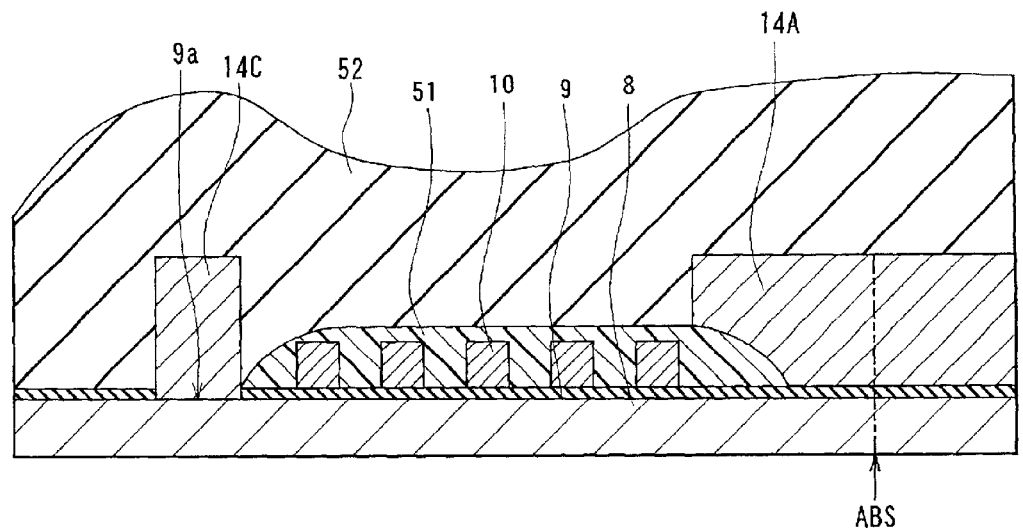
FIG. 5 is a cross-sectional view illustrating a step that follows FIG. 4.

Then, as shown in FIG. 5, the non-magnetic layer 52 is formed by sputtering so as to cover the pole portion layer 14A and the insulating layer 51 at least around the pole portion layer 14A. In the example shown in FIG. 5, the non-magnetic layer 52 is formed so as to cover the entirety of the deposited surface.

Figure 6:
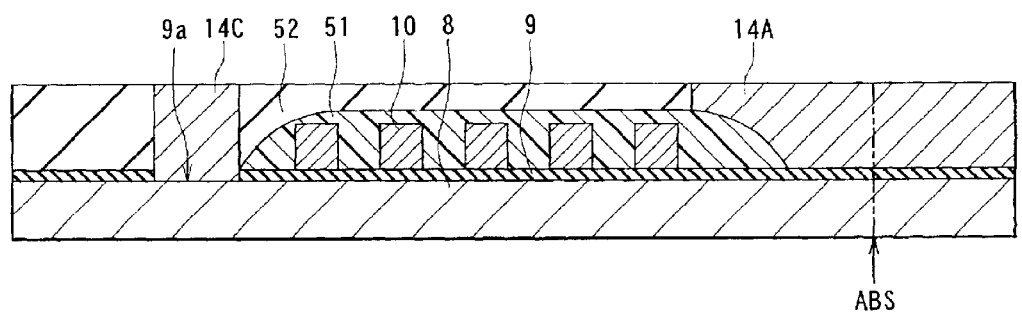
FIG. 6 is a cross-sectional view illustrating a step that follows FIG. 5.

Then, as shown in FIG. 6, the non-magnetic layer 52 is polished by chemical mechanical polishing, for example, so that the coupling portion 14C and the pole portion layer 14A are exposed, to thereby flatten at least a part of the top surface of the pole portion layer 14A, to which the yoke portion layer 14B to be formed later is magnetically connected, together with the top surface of the non-magnetic layer 52. The non-magnetic layer 52 may not necessarily be provided. When the non-magnetic layer 52 is not provided, the aforementioned flattening process is not required.

Figure 7:
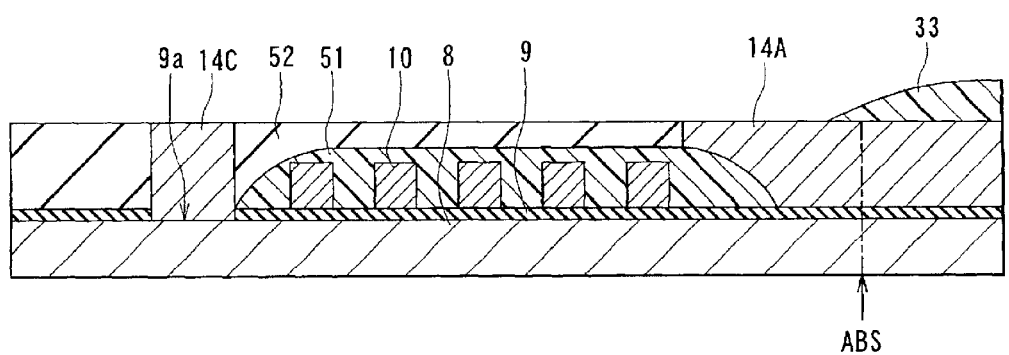
FIG. 7 is a cross-sectional view illustrating a step that follows FIG. 6.

Then, as shown in FIG. 7, a protective layer 33 is formed so as to cover a part of the pole portion layer 14A located near the medium facing surface ABS. When the non-magnetic layer 52 is not provided, it is preferable to form the protective layer 33 so as to cover not only the top surface of the pole portion layer 14A but also both side surfaces of the pole portion layer 14A near the medium facing surface ABS.

As the material of the protective layer 33, an organic material such as a photosensitive resist or an inorganic material such as alumina may be used. However, since it is preferable to remove the protective layer 33 in a later step, an easily removable material such as a photosensitive resist may be preferably used as the material of the protective layer 33. Use of a photosensitive resist as the material of the protective layer 33 makes it possible to easily form the protective layer 33 by photolithography only on a part of the pole portion layer 14A located near the medium facing surface ABS, and also makes it possible to easily remove the protective layer 33 using a solvent.

In a later step, as described later, the electrode layer 34 is removed by dry etching. In order to easily remove the electrode layer 34 in that step, it is preferable that the protective layer 33 is formed to have blunt edges or, for example, a curved top surface, as shown in FIG. 7. If a photosensitive resist is used as the material of the protective layer 33, it is possible to form the protective layer 33 with blunt edges by going through the steps of forming a patterned resist by photolithography and then allowing the photosensitive resist to reflow by heating and the like. In this case, it is preferable that the photosensitive resist to be used exhibits a good fluidity. For example, as such a photosensitive resist, preferably used is a novolak-based resist such as Resist AZP4000 (product name) manufactured by Clariant Japan.

If an inorganic material such as alumina is used as the material of the protective layer 33, it is possible to form the protective layer 33 with blunt edges through the use of liftoff method.

It is preferable to form the protective layer 33 within a region where a frame 35, which is used to form the yoke portion layer 14B, to be described later, is formed. It is also preferable that the protective layer 33 has a thickness equal to or less than that of the frame 35. Here, as an example, the protective layer 33 is 3.5 µm in thickness.

Figure 8:
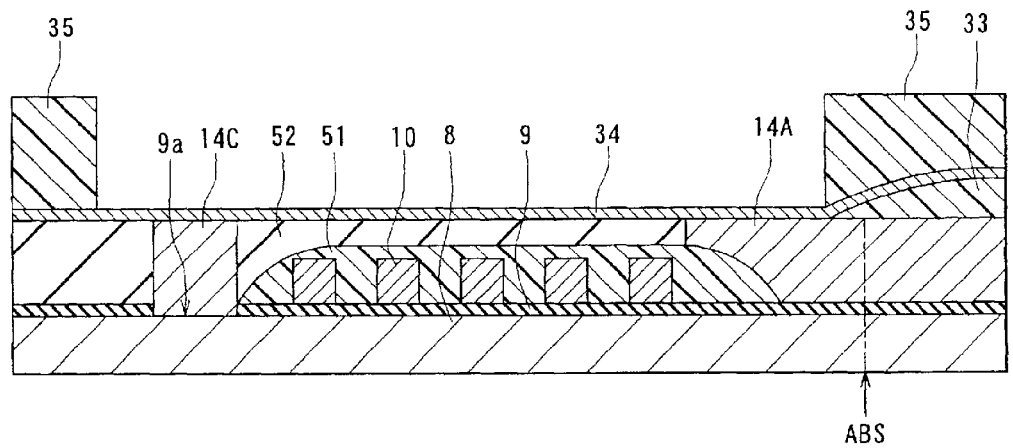
FIG. 8 is a cross-sectional view illustrating a step that follows FIG. 7.

Then, as shown in FIG. 8, the electrode layer 34 to be used as an electrode when forming the yoke portion layer 14B by electroplating is formed through sputtering so as to cover the pole portion layer 14A, the coupling portion 14C, the non-magnetic layer 52 and the protective layer 33. The electrode layer 34 is formed of a conductive material such as metal. For example, to form the electrode layer 34, a Ti (titanium) layer serving as its base is first deposited and then a layer made of the same material as that of the yoke portion layer 14B is formed on the Ti layer. For example, the electrode layer 34 has a thickness of 0.1 µm or less.

Then, the frame 35, which has a gap portion corresponding to the shape of the yoke portion layer 14B, is formed of a photosensitive resist by photolithography on the electrode layer 34. The frame 35 preferably has a thickness equal to or greater than the yoke portion layer 14B. It is also preferable that the thickness of the frame 35 is equal to or greater than that of the protective layer 33. This is to prevent formation of a plating layer on the electrode layer 34 formed on the protective layer 33. Here, as an example, the thickness of the frame 35 is 7 µm or more.

Figure 9:
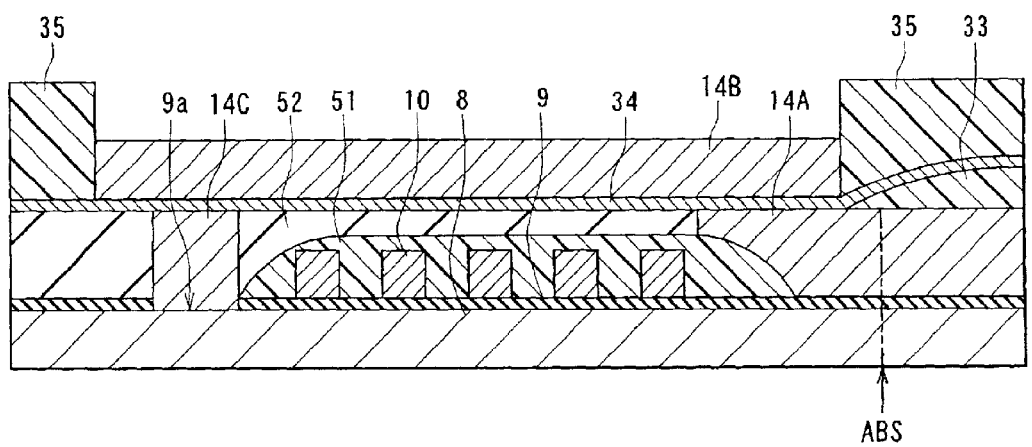
FIG. 9 is a cross-sectional view illustrating a step that follows FIG. 8.

Then, as shown in FIG. 9, using the frame 35, the yoke portion layer 14B is formed on the electrode layer 34 through electroplating (or frame plating).

Figure 10:
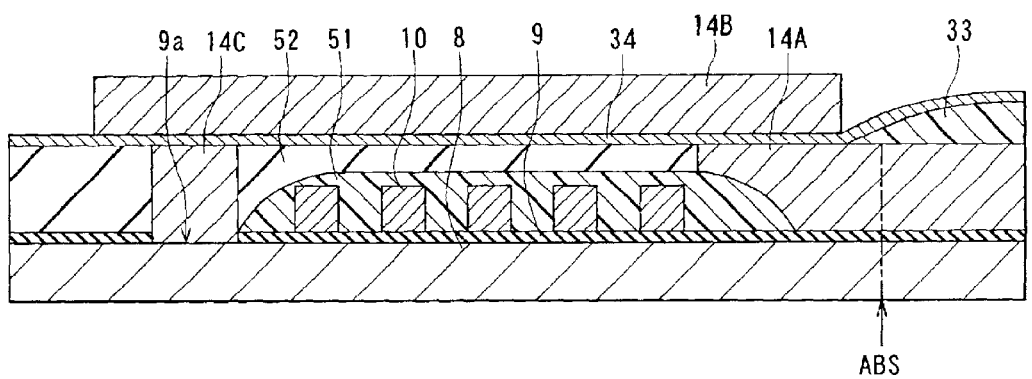
FIG. 10 is a cross-sectional view illustrating a step that follows FIG. 9.

Then, as shown in FIG. 10, the frame 35 is removed using a solvent. At this time, the protective layer 33 underlies the electrode layer 34 and is therefore not removed.

Figure 11:
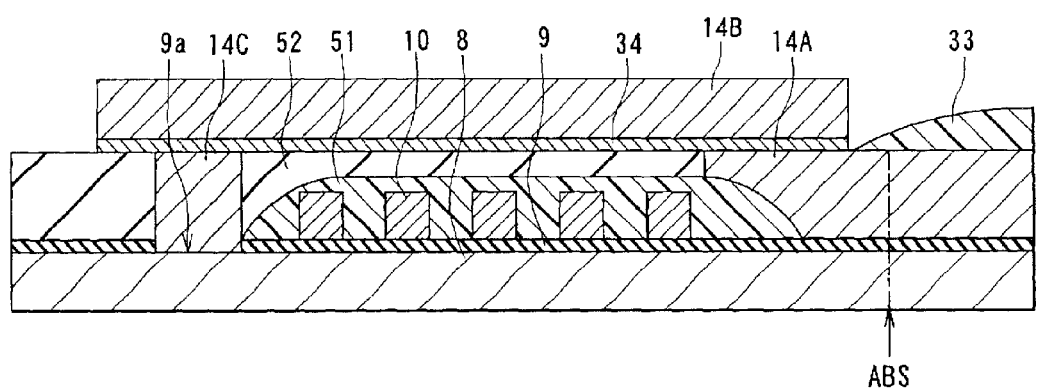
FIG. 11 is a cross-sectional view illustrating a step that follows FIG. 10.

Then, as shown in FIG. 11, an unnecessary portion of the electrode layer 34, that is, the portion that has been present under the frame 35, is removed through dry etching. The protective layer 33 is thereby exposed. In some cases, this may cause the surface of the protective layer 33 to be hardened due to the ion energy of the dry etching. However, after the dry etching, subjecting the surface of the protective layer 33 to ashing through the use of oxygen plasma, for example, will make it easier to remove the protective layer 33 in a later step.

On the other hand, if frame plating is used to form the yoke portion layer 14B, a plating layer is formed also on an unnecessary portion other than on the yoke portion layer 14B. For this reason, although not shown, the plating layer formed on the unnecessary portion is removed through wet etching in the following manner. First, a cover of a resist is formed by photolithography so as to cover the yoke portion layer 14B. At this time, the protective layer 33 is covered with the cover. Then, wet etching is performed to remove the plating layer formed on the unnecessary portion. If the electrode layer 34 is made of an easily-etchable material, such as a material the same as that of the plating layer, it is also possible, in the step of the wet etching, to remove the electrode layer 34 which underlies the plating layer.

Figure 12:
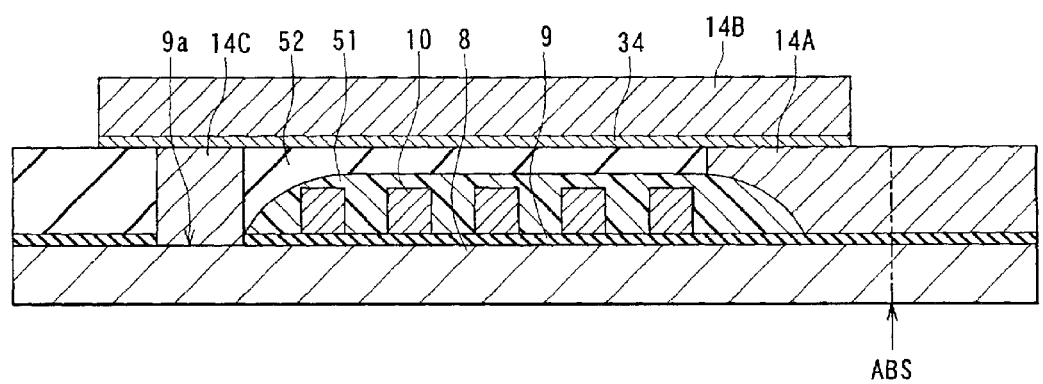
FIG. 12 is a cross-sectional view illustrating a step that follows FIG. 11.

Then, the aforementioned cover is removed using a solvent. The protective layer 33 is also removed at this time, as shown in FIG. 12. If the protective layer 33 is made of an inorganic material such as alumina, removal of the protective layer 33 is not necessarily required. Then, although not shown, part of the unnecessary portion of the electrode layer 34 that could not be removed by the wet etching, that is, for example, the Ti layer as the base of the electrode layer 34, is removed through dry etching.

Then, as shown in FIG. 1, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

As a comparative example against the method of manufacturing the thin-film magnetic head according to the present embodiment, described below with reference to FIGS. 13 to 16 is a method of manufacturing a thin-film magnetic head in which the protective layer 33 is not formed. In FIGS. 13 to 16, the substrate 1 to the non-magnetic layer 7 are not shown. This comparative example employs the same steps as those of the present embodiment up to the step of flattening the top surface of the pole portion layer 14A together with the top surface of the non-magnetic layer 52, as shown in FIG. 6.

Figure 13:
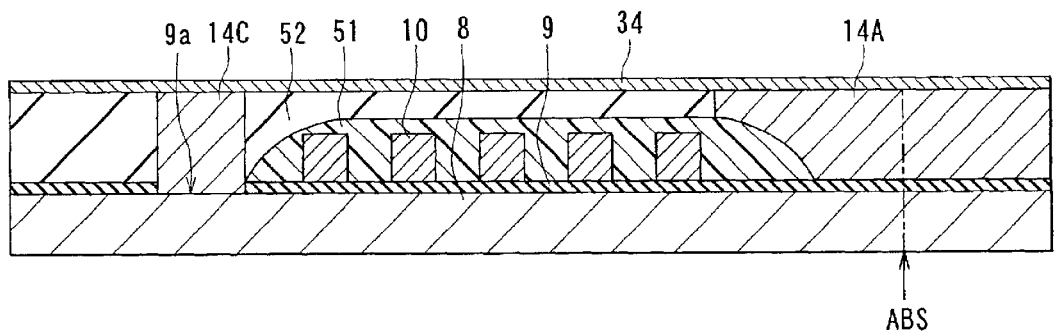
FIG. 13 is a cross-sectional view illustrating a step of a method of manufacturing a thin-film magnetic head of a comparative example against the first embodiment of the invention.

Then, in the comparative example, as shown in FIG. 13, the electrode layer 34 is formed by sputtering so as to cover the pole portion layer 14A, the coupling portion 14C, and the non-magnetic layer 52.

Figure 14:
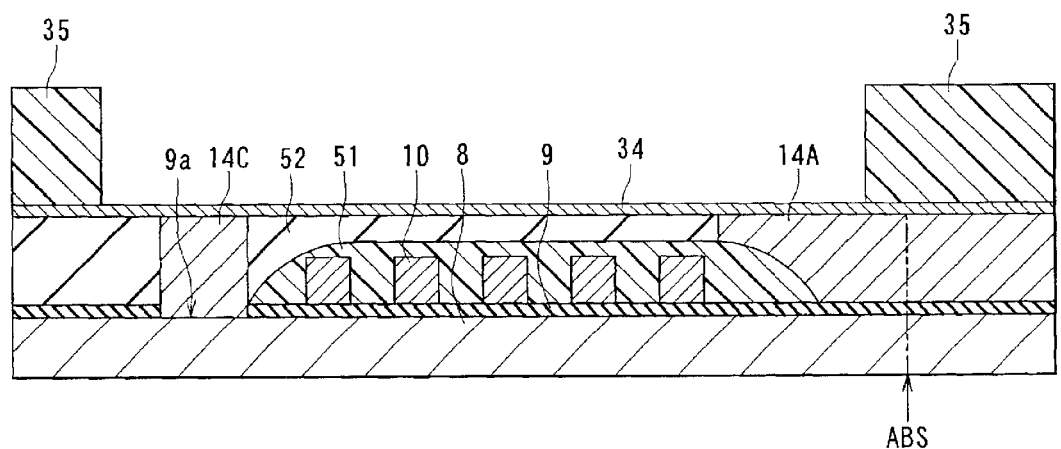
FIG. 14 is a cross-sectional view illustrating a step that follows FIG. 13.

Then, as shown in FIG. 14, the frame 35 having a gap portion corresponding to the shape of the yoke portion layer 14B is formed of a photosensitive resist by photolithography on the electrode layer 34.

Figure 15:
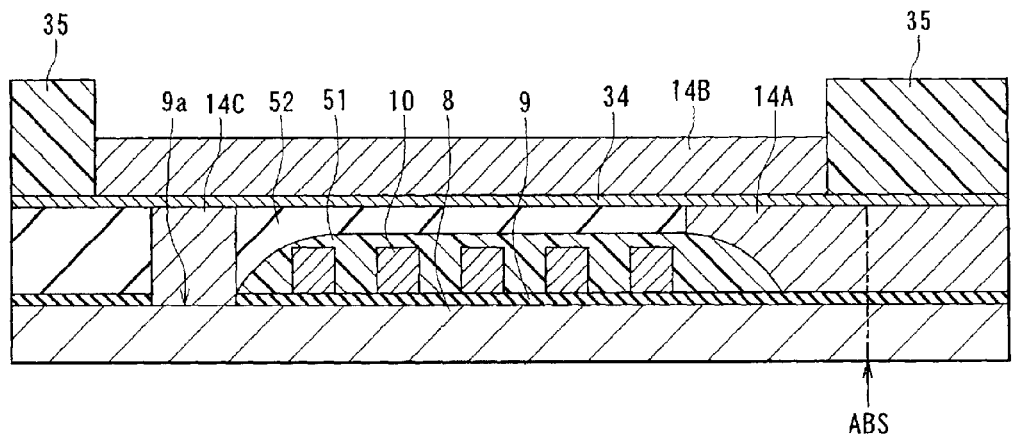
FIG. 15 is a cross-sectional view illustrating a step that follows FIG. 14.

Then, as shown in FIG. 15, the yoke portion layer 14B is formed on the electrode layer 34 through electroplating (or frame plating) using the frame 35.

Figure 16:
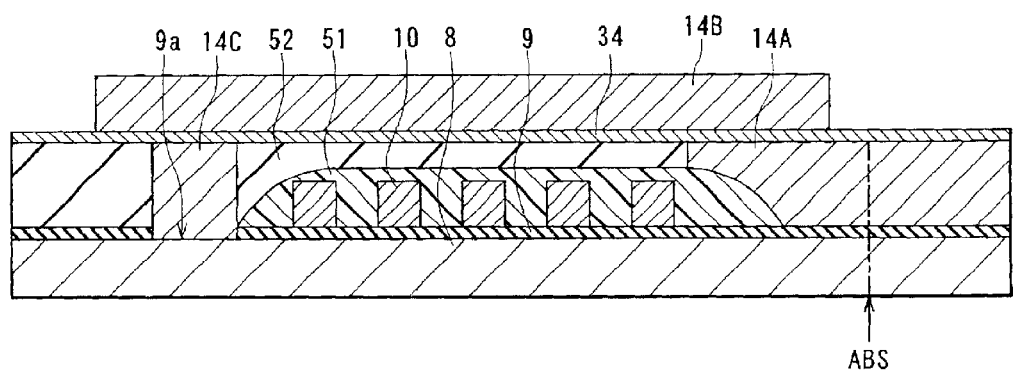
FIG. 16 is a cross-sectional view illustrating a step that follows FIG. 15.

Then, as shown in FIG. 16, the frame 35 is removed using a solvent. The subsequent steps of the comparative example are the same as those of the present embodiment.

According to the comparative example, after the frame 35 has been removed, removing the unnecessary portion of the electrode layer 34 that has been present under the frame 35 by dry etching may cause the pole portion layer 14A to be deformed or damaged, which can result in deterioration in property. Further, where the non-magnetic layer 52 is not provided, the electrode layer 34 is formed also on both side surfaces of the pole portion layer 14A near the medium facing surface. It is difficult to remove the electrode layer 34 that is formed on the side surfaces. If part of the electrode layer 34 remains on the side surfaces, the magnetic flux can flow into the recording medium from this part of the electrode layer 34, too, which can result in an increase in the effective track width.

In contrast, in the embodiment of the invention, the protective layer 33 is formed before forming the electrode layer 34, so as to cover a part of the pole portion layer 14A located near the medium facing surface ABS. According to the embodiment, it is therefore possible to prevent the pole portion layer 14A from being deformed or damaged when removing the unnecessary portion of the electrode layer 34 after the yoke portion layer 14B has been formed. In the embodiment, if the non-magnetic layer 52 is not provided and the protective layer 33 is formed so as to also cover both side surfaces of the pole portion layer 14A near the medium facing surface ABS, it is possible to prevent the electrode layer 34 from being formed on the side surfaces, and to thereby prevent an increase in the effective track width due to the electrode layer 34.

In contrast to the comparative example, the embodiment of the invention provides the aforementioned advantageous effects only by adding the simple step of forming the protective layer 33 by photolithography.

According to the embodiment, the protective layer 33 has blunt edges. Therefore, when the electrode layer 34 formed around the protective layer 33 is removed by ion milling, for example, it is possible to prevent a portion of the electrode layer 34 formed around the protective layer 33 from not being hit by ions or to prevent a substance forming the electrode layer 34 from re-depositing on the protective layer 33 after having been removed therefrom. As a result, the embodiment makes it possible to easily remove the electrode layer 34 formed around the protective layer 33. This will be explained in more detail in a third embodiment.

Figure 17:
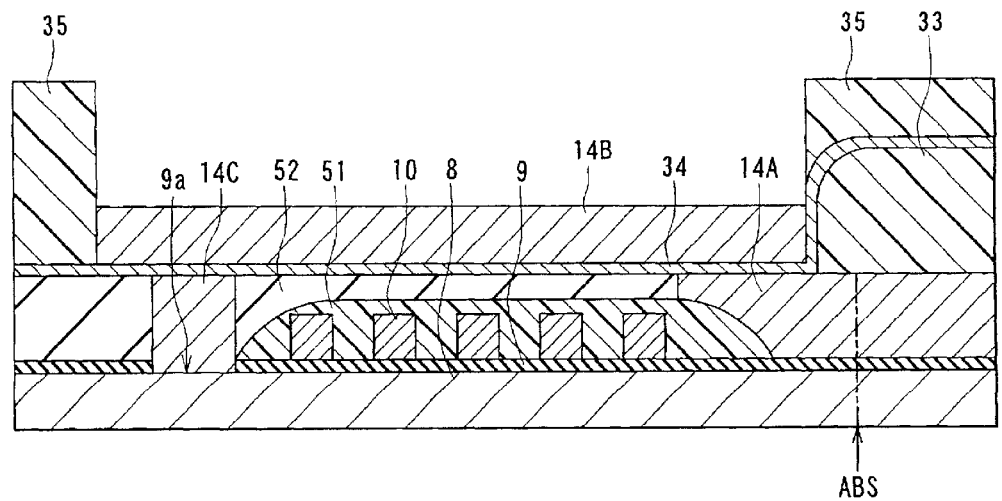
FIG. 17 is a cross-sectional view illustrating a step of a method of manufacturing a thin-film magnetic head of a modified example of the first embodiment of the invention.

On the other hand, in the present embodiment, the protective layer 33 may define the position of an end of the yoke portion layer 14B closer to the medium facing surface ABS, as shown in FIG. 17. FIG. 17 is a cross-sectional view illustrating the same step as that shown in FIG. 9. In the step Shown in FIG. 17, an end of the protective layer 33 closer to the yoke portion layer 14B is disposed to oppose to the end of the yoke portion layer 14B closer to the medium facing surface ABS via the electrode layer 34. In the step shown in FIG. 17, the protective layer 33 is formed such that at least a part of the end thereof closer to the yoke portion layer 14B, the part opposing to the end of the yoke portion layer 14B closer to the medium facing surface ABS, forms a surface perpendicular to the surface of the substrate.

As shown in FIG. 17, when the protective layer 33 is utilized to define the position of the end of the yoke portion layer 14B closer to the medium facing surface ABS, the position of the end of the yoke portion layer 14B closer to the medium facing surface ABS can be defined more accurately as compared with the case where the end of the yoke portion layer 14B closer to the medium facing surface ABS is defined using the frame 35. The reasons are described below.

As shown in FIG. 9, suppose that the frame 35 is used to define the position of the end of the yoke portion layer 14B closer to the medium facing surface ABS. In this case, there exists a slanting surface of the electrode layer 34 underlying the frame 35 near the medium facing surface ABS, the slanting surface facing toward the gap portion of the frame 35 (or toward the yoke portion layer 14B). This surface acts as a reflecting surface when performing exposure of a photosensitive resist for patterning the frame 35. For this reason, when the photosensitive resist is exposed to light, the amount of the exposure becomes unstable in a region located near a position to be an end of the frame 35 closer to the gap portion. Consequently, in this region, it becomes difficult to accurately pattern the frame 35 and therefore difficult to define the position of the end of the yoke portion layer 14B closer to the medium facing surface ABS with high precision.

On the other hand, as shown in FIG. 17, suppose that the protective layer 33 is used to define the position of the end of the yoke portion layer 14B closer to the medium facing surface ABS. In this case, under the frame 35, nothing is to act as a reflecting surface when exposing the photosensitive resist for patterning the frame 35. It is therefore possible to define the position of the end of the yoke portion layer 14B closer to the medium facing surface ABS with higher precision as compared with the case where the frame 35 is used to define the position of the end of the yoke portion layer 14B closer to the medium facing surface ABS.

Figure 18:
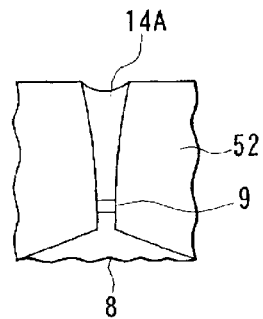
FIG. 18 is an explanatory view illustrating a state of the top surf ace of a pole portion layer after removal of an electrode layer in the case where no protective layer is formed.

On the other hand, consider the case where the non-magnetic layer 52 is provided and ion milling is employed to remove the electrode layer 34. In this case, since the material of the pole portion layer 14A has an etching rate different from that of the material of the non-magnetic layer 52, etching the pole portion layer 14A and the non-magnetic layer 52 causes a stepped portion to develop at the interface between the pole portion layer 14A and the non-magnetic layer 52. For example, suppose that the non-magnetic layer 52 is made of alumina and the pole portion layer 14A is made of an iron-nickel alloy. In this case, since the etching rate of an iron-nickel alloy is greater than that of alumina and is, for example, equal to or less than twice that of alumina, the etching may cause a recessed portion to develop on the top surface of the pole portion layer 14A, as shown in FIG. 18.

Figure 19:
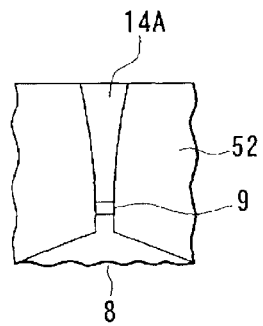
FIG. 19 is an explanatory view illustrating a state of the top surface of the pole portion layer after removal of the electrode layer in the case where the protective layer is formed.

In contrast to this, according to the present embodiment, the portion of the pole portion layer 14A exposed in the medium facing surface ABS is covered with the protective layer 33 and therefore not etched when removing the electrode layer 34. Accordingly, as shown in FIG. 19, in the medium facing surface ABS an end of the pole portion layer 14A farther from the gap layer 9 is maintained in the state provided after the flattening process shown in FIG. 6. The thin-film magnetic head disclosed in this embodiment may be used not only with the longitudinal magnetic recording scheme but also with the vertical magnetic recording scheme. To use the thin-film magnetic head with the vertical magnetic recording scheme, it is preferable to dispose the first magnetic layer 8 serving as an auxiliary magnetic pole on the trailing side in the traveling direction of the recording medium (or on the air-inflow-end side of the slider) and to dispose the pole portion layer 14A serving as the main magnetic pole on the leading side in the traveling direction of the recording medium (or on the air-outflow-end side of the slider). In this case, the leading-side end of the pole portion layer 14A serving as the main magnetic pole, in the traveling direction of the recording medium, that is, the end of the pole portion layer 14A farther from the gap layer 9, is preferably made flat in the medium facing surface ABS. As described above, the manufacturing method according to the present embodiment allows the end of the pole portion layer 14A farther from the gap layer 9 to be flat and is therefore effective particularly in the case of applying the thin-film magnetic head to the use with the vertical magnetic recording scheme.

In the present embodiment, a thin-film coil may be formed on the flattened non-magnetic layer 52 after the flattening process shown in FIG. 6. It is obvious that the method of this embodiment which provides the protective layer 33 is also effective when forming the thin-film coil by electroplating.

[Second Embodiment]

Figure 20:
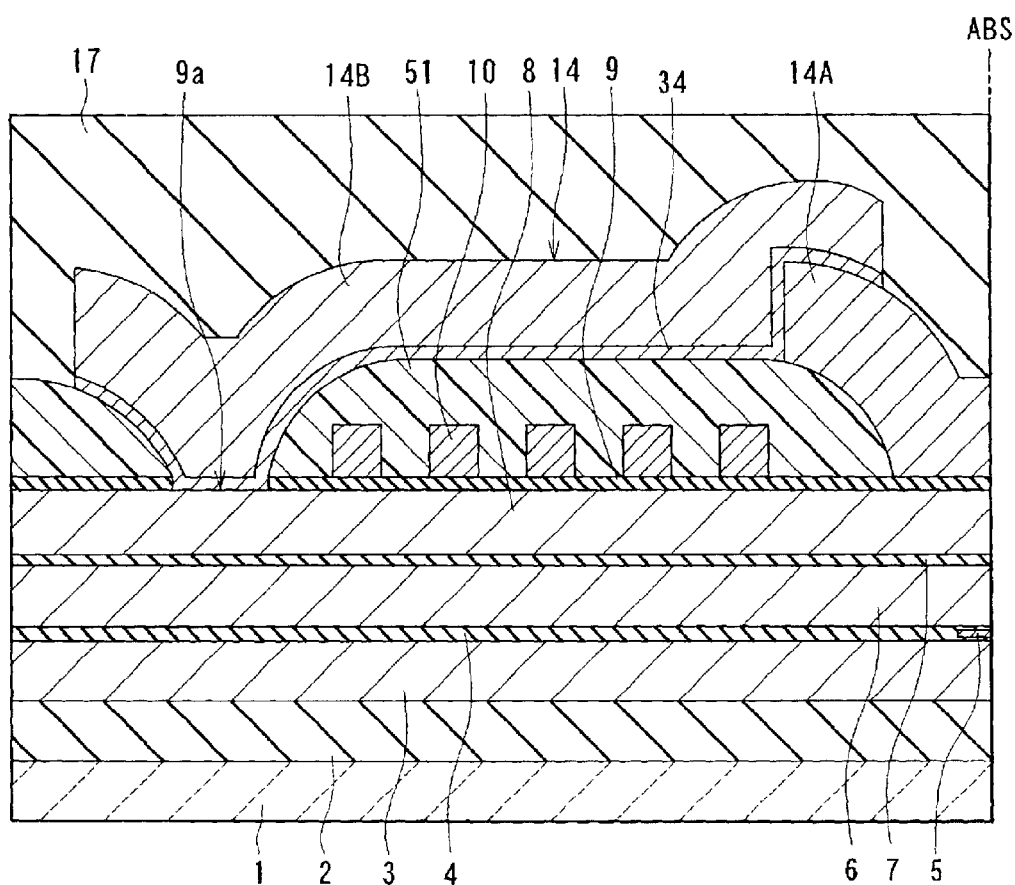
FIG. 20 is a cross-sectional view illustrating a structure of a thin-film magnetic head in a second embodiment of the invention.

Now, a method of manufacturing a thin-film magnetic head according to a second embodiment of the invention is described below. To begin with, referring to FIG. 20, explained is the structure of a thin-film magnetic head to which the method of manufacturing the thin-film magnetic head according to the second embodiment is applied. The thin-film magnetic head in this embodiment is suitable for use with the longitudinal magnetic recording scheme as in the case of the first embodiment. FIG. 20 is a cross-sectional view illustrating the structure of the thin-film magnetic head in this embodiment. FIG. 20 shows a cross section orthogonal to the medium facing surface and the surface of the substrate.

In the thin-film magnetic head in this embodiment, there is no non-magnetic layer 52 disclosed in the first embodiment and the second magnetic layer 14 is different in structure from that disclosed in the first embodiment. In this embodiment, the second magnetic layer 14 has the pole portion layer 14A and the yoke portion layer 14B, but does not have the coupling portion 14C disclosed in the first embodiment. The yoke portion layer 14B magnetically couples the pole portion layer 14A and the first magnetic layer 8 to each other.

As in the first embodiment, the pole portion layer 14A is formed on the gap layer 9, and a part of the pole portion layer 14A farther from the medium facing surface ABS sits on the insulating layer 51.

The yoke portion layer 14B is formed on the insulating layer 51 via the electrode layer 34 over a region extending from a predetermined position located away from the medium facing surface ABS to at least the position where the contact hole 9a is formed. A part of the yoke portion layer 14B located near the medium facing surface ABS sits on the pole portion layer 14A and is magnetically connected to the pole portion layer 14A in part of: a top surface of the pole portion layer 14A; an end surface of the pole portion layer 14A farther from the medium facing surface ABS; and both side surfaces of the pole portion layer 14A in the width direction.

The remainder of the structure of the thin-film magnetic head in this embodiment is the same as that of the head in the first embodiment.

Figure 21:
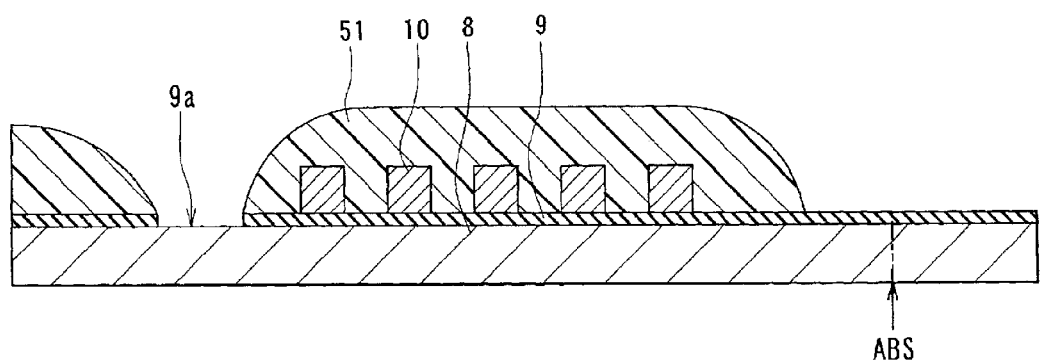
FIG. 21 is a cross-sectional view illustrating a step of a method of manufacturing the thin-film magnetic head according to the second embodiment of the invention.

Now, referring to FIGS. 21 to 28, the method of manufacturing the thin-film magnetic head according to this embodiment is explained below. In FIGS. 21 to 28, the substrate 1 to the non-magnetic layer 7 are not shown. The method of manufacturing the thin-film magnetic head of this embodiment employs the same steps as those of the first embodiment up to the step of forming the insulating layer 51 as shown in FIG. 21.

Figure 22:
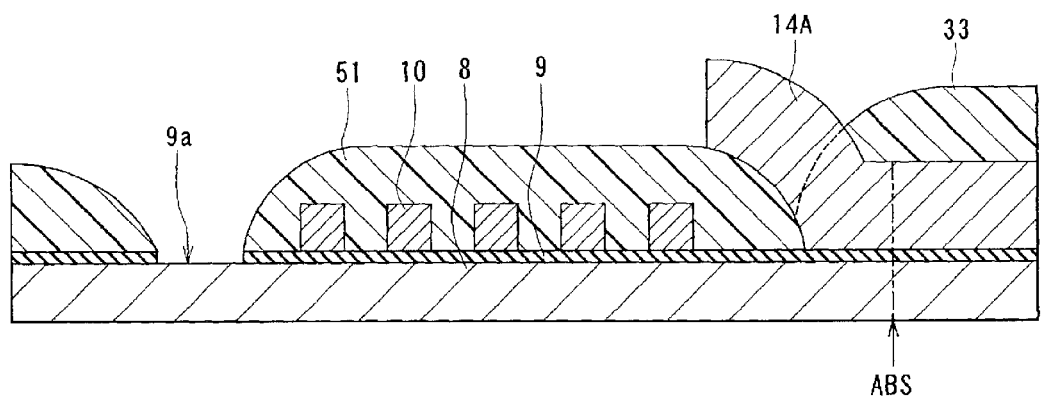
FIG. 22 is a cross-sectional view illustrating a step that follows FIG. 21.
Figure 29:
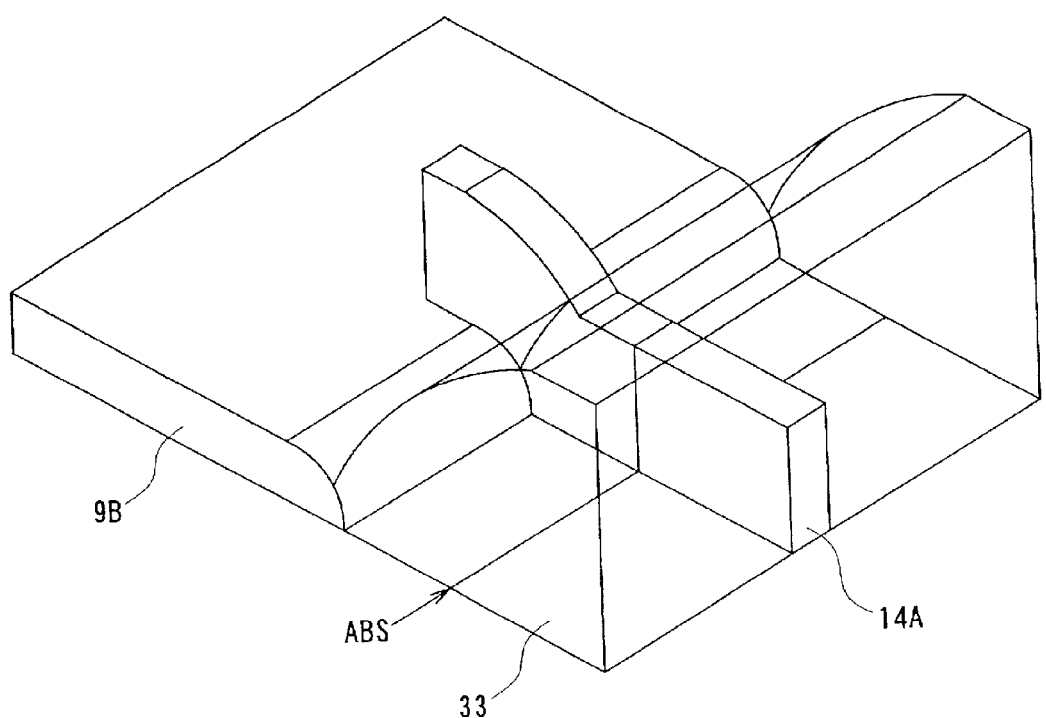
FIG. 29 is a perspective view illustrating a state shown in FIG. 22.

Then, in this embodiment, as shown in FIG. 22, the pole portion layer 14A is formed on the gap layer 9 using a well-known photolithography technique and a well-known deposition technique (e.g., electroplating or sputtering). Then, the protective layer 33 is formed so as to cover a part of the pole portion layer 14A located near the medium facing surface ABS. FIG. 29 is a perspective view illustrating the state shown in FIG. 22. As shown in FIG. 29, in this embodiment, the protective layer 33 is formed so as to cover the top surface and both side surfaces of the pole portion layer 14A near the medium facing surface ABS.

Figure 23:
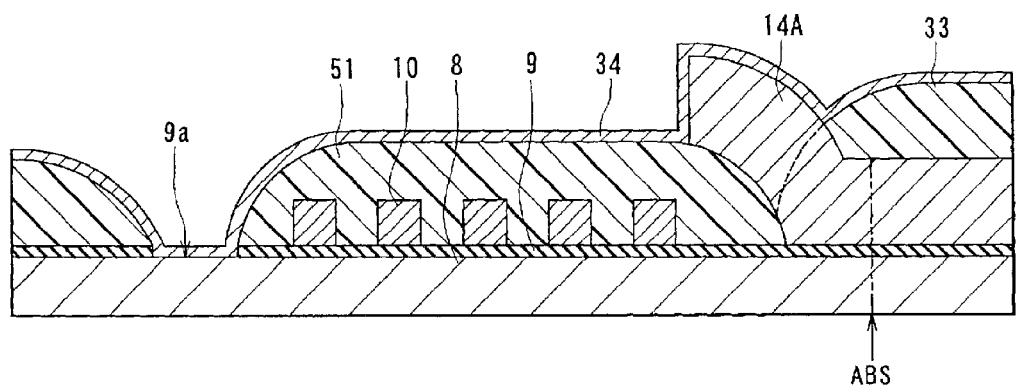
FIG. 23 is a cross-sectional view illustrating a step that follows FIG. 22.

Then, as shown in FIG. 23, the electrode layer 34 is formed by sputtering so as to cover a portion of the first magnetic layer 8 exposed from the contact hole 9a, the pole portion layer 14A, the insulating layer 51 and the protective layer 33.

Figure 24:
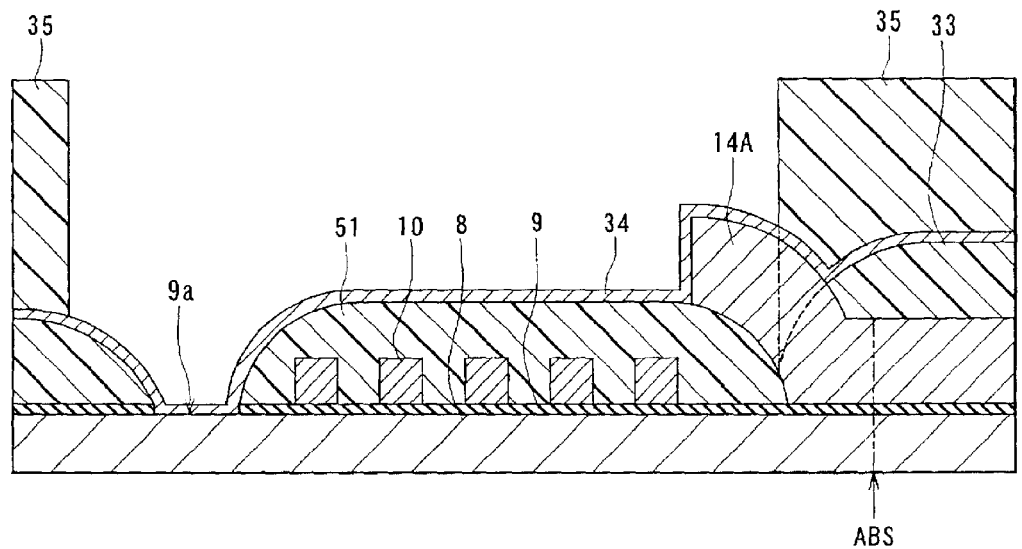
FIG. 24 is a cross-sectional view illustrating a step that follows FIG. 23.

Then, as shown in FIG. 24, the frame 35 having a gap portion corresponding to the shape of the yoke portion layer 14B is formed of a photosensitive resist by photolithography on the electrode layer 34.

Figure 25:
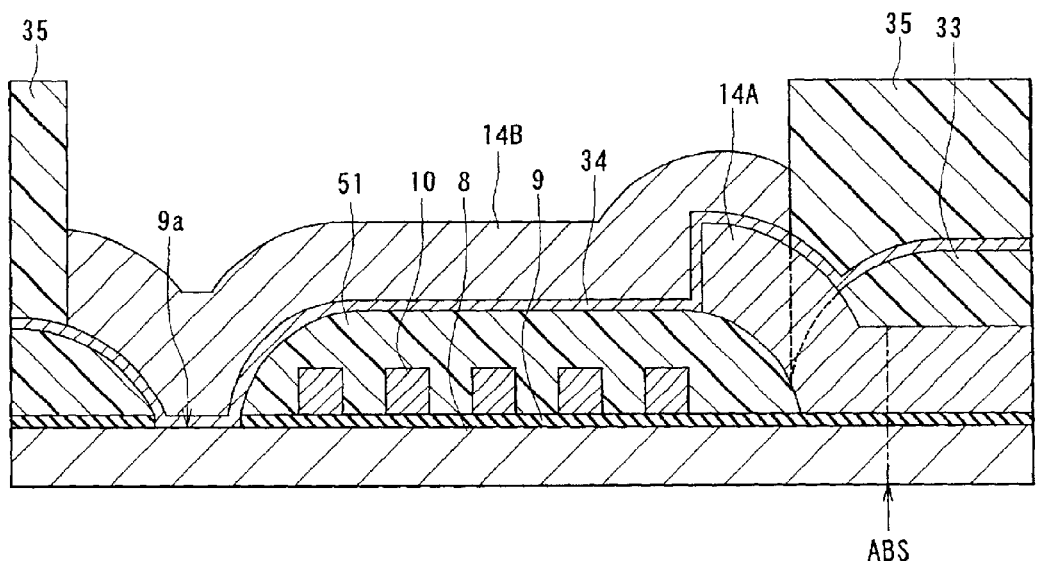
FIG. 25 is a cross-sectional view illustrating a step that follows FIG. 24.

Then, as shown in FIG. 25, the yoke portion layer 14B is formed on the electrode layer 34 by electroplating (or frame plating) using the frame 35.

Figure 26:
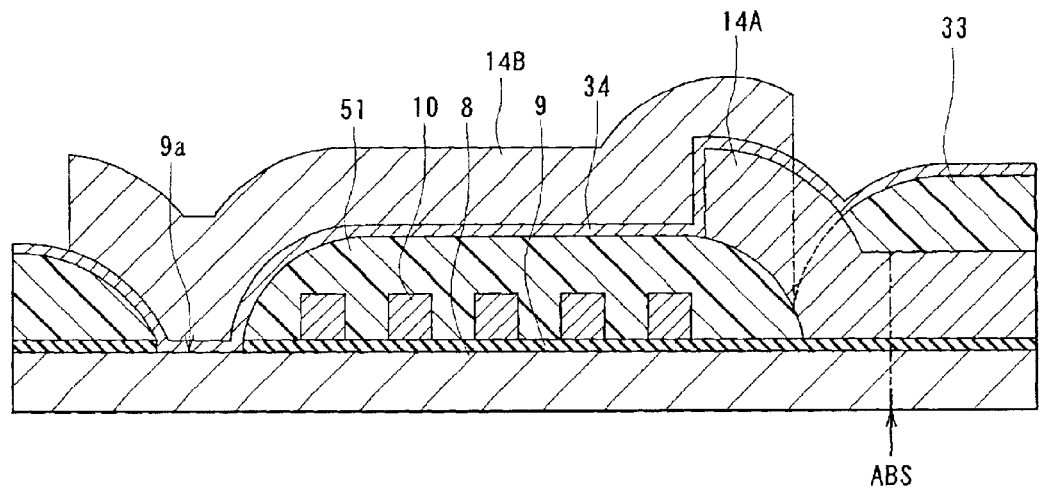
FIG. 26 is a cross-sectional view illustrating a step that follows FIG. 25.

Then, as shown in FIG. 26, the frame 35 is removed using a solvent. At this stage, the protective layer 33 underlies the electrode layer 34 and is therefore not removed.

Figure 27:
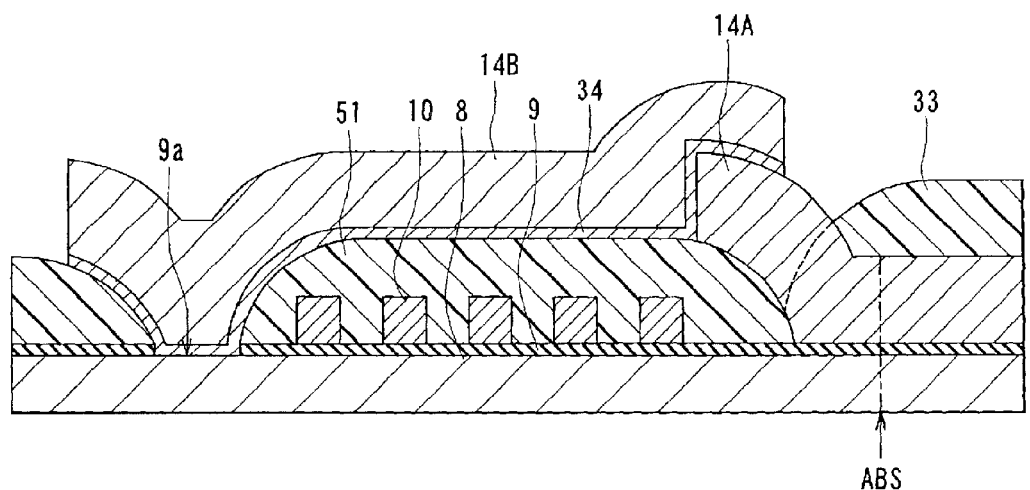
FIG. 27 is a cross-sectional view illustrating a step that follows FIG. 26.

Then, as shown in FIG. 27, an unnecessary portion of the electrode layer 34, that is, the portion that has been present under the frame 35, is removed through dry etching.

Figure 28:
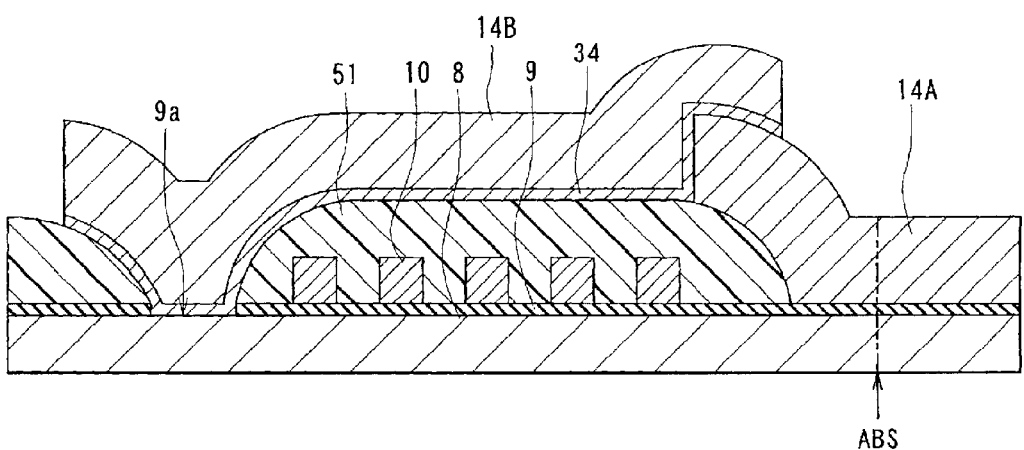
FIG. 28 is a cross-sectional view illustrating a step that follows FIG. 27.

The protective layer 33 is thereby exposed. Then, as shown in FIG. 28, in the same manner as in the first embodiment, the plating layer formed on the unnecessary portion is removed through wet etching, the protective layer 33 is removed, and part of the unnecessary portion of the electrode layer 34 that could not be removed by the wet etching is removed through dry etching.

Then, as shown in FIG. 20, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

Figure 30:
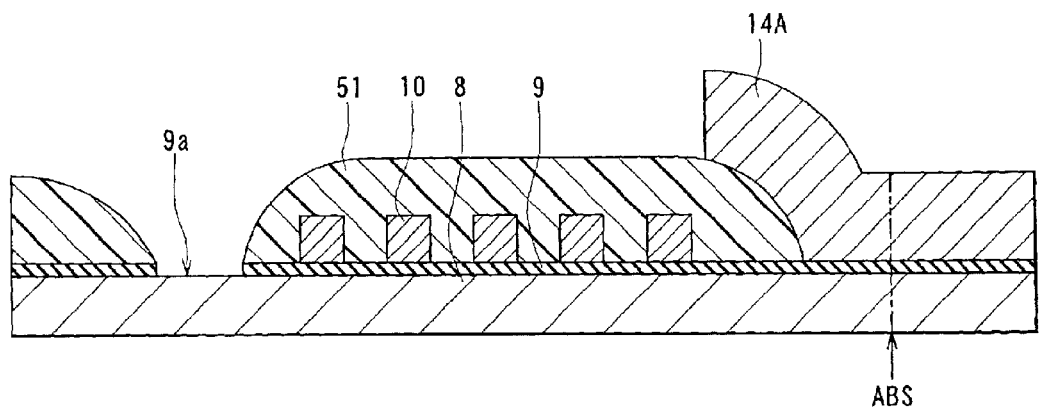
FIG. 30 is a cross-sectional view illustrating a step of a method of manufacturing a thin-film magnetic head of a comparative example against the second embodiment of the invention.

As a comparative example against the method of manufacturing the thin-film magnetic head according to the present embodiment, described below with reference to FIGS. 30 to 34 is a method of manufacturing a thin-film magnetic head in which the protective layer 33 is not formed. In FIGS. 30 to 34, the substrate 1 to the non-magnetic layer 7 are not shown. This comparative example employs the same steps as those of the present embodiment up to the step of forming the pole portion layer 14A as shown in FIG. 30.

Figure 31:
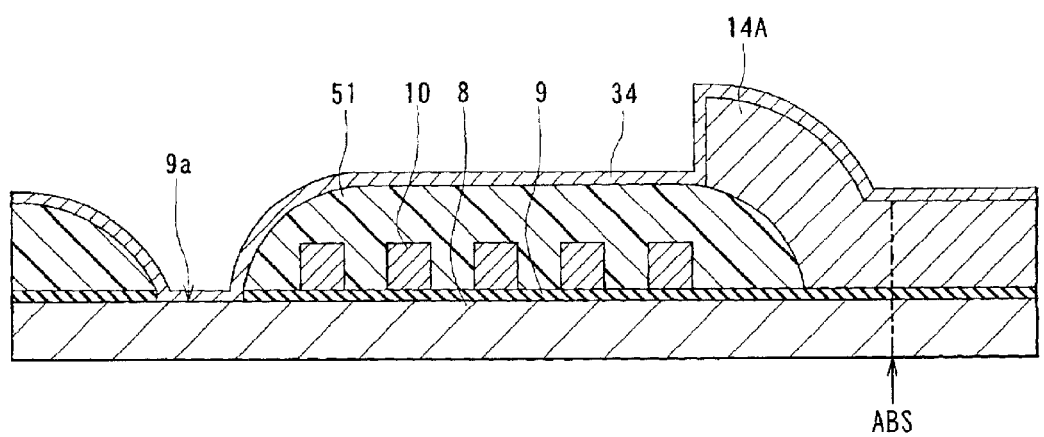
FIG. 31 is a cross-sectional view illustrating a step that follows FIG. 30.

Then, in the comparative example, as shown in FIG. 31, the electrode layer 34 is formed by sputtering so as to cover the portion of the first magnetic layer 8 that is exposed from the contact hole 9a, the pole portion layer 14A, and the insulating layer 51.

Figure 32:
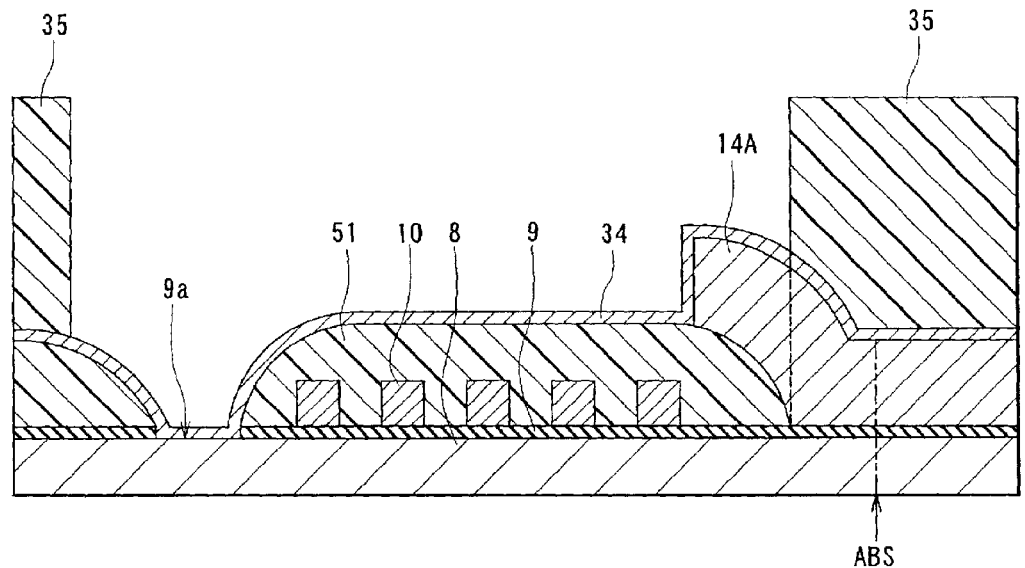
FIG. 32 is a cross-sectional view illustrating a step that follows FIG. 31.

Then, as shown in FIG. 32, the frame 35 having a gap portion corresponding to the shape of the yoke portion layer 14B is formed of a photosensitive resist by photolithography on the electrode layer 34.

Figure 33:
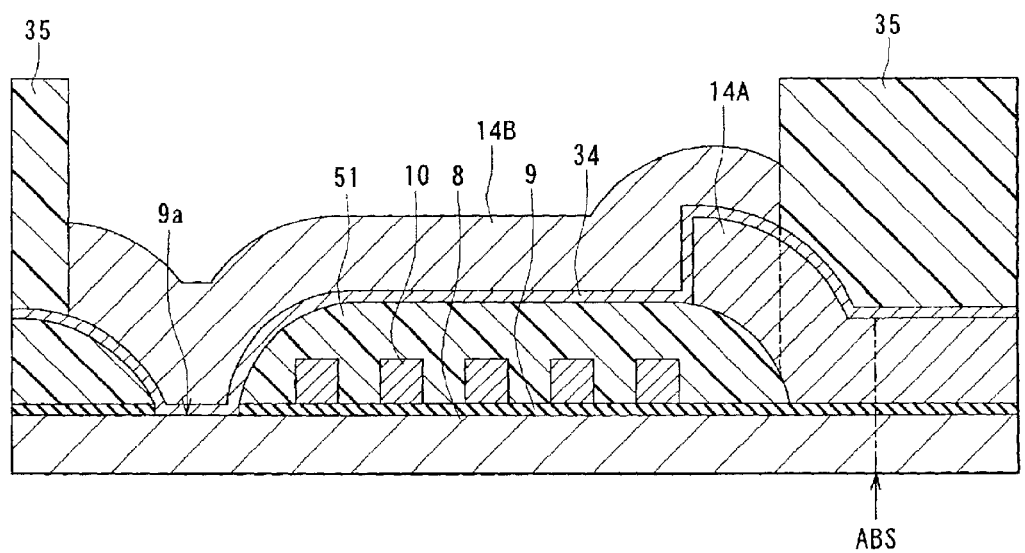
FIG. 33 is a cross-sectional view illustrating a step that follows FIG. 32.

Then, as shown in FIG. 33, the yoke portion layer 14B is formed on the electrode layer 34 by electroplating (or frame plating) using the frame 35.

Figure 34:
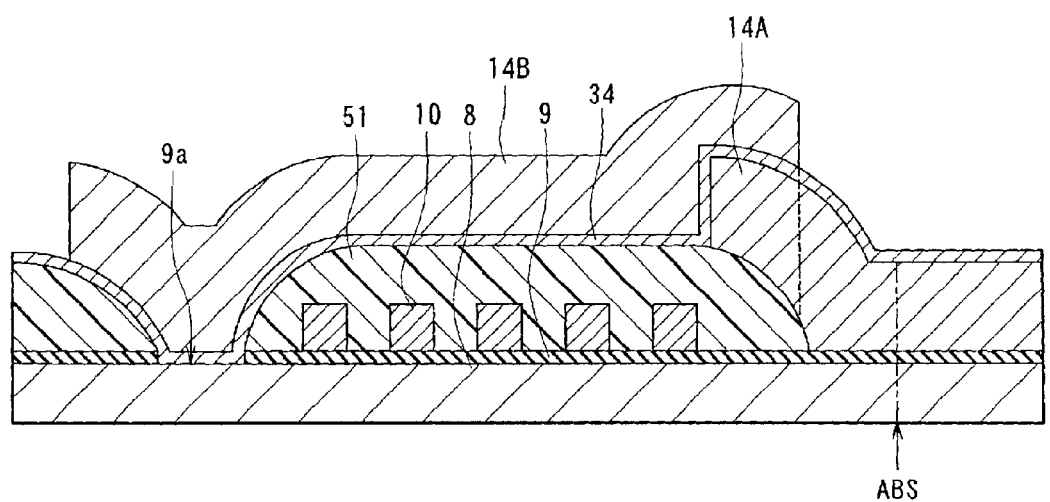
FIG. 34 is a cross-sectional view illustrating a step that follows FIG. 33.

Then, as shown in FIG. 34, the frame 35 is removed using a solvent. The subsequent steps of the comparative example are the same as those of the present embodiment.

According to the comparative example, after the frame 35 has been removed, removing the unnecessary portion of the electrode layer 34 that has been present under the frame 35 by dry etching may cause the pole portion layer 14A to be deformed. Further, according to the comparative example, the electrode layer 34 is formed also on both side surfaces of the pole portion layer 14A near the medium facing surface. It is difficult to remove the electrode layer 34 formed on the side surfaces without damaging the pole portion layer 14A. If part of the electrode layer 34 remains on the side surfaces, the magnetic flux can flow into the recording medium from this part of the electrode layer 34, too, which can result in an increase in the effective track width.

In contrast, in the embodiment of the invention, the protective layer 33 is formed before forming the electrode layer 34, so as to cover a part of the pole portion layer 14A located near the medium facing surface ABS. According to the embodiment, it is therefore possible to prevent the pole portion layer 14A from being deformed or damaged when removing the unnecessary portion of the electrode layer 34 after the yoke portion layer 14B has been formed. According to the embodiment, it is also possible to prevent the electrode layer 34 from being formed on both side surfaces of the pole portion layer 14A near the medium facing surface ABS, and to thereby prevent an increase in the effective track width due to the electrode layer 34.

When the width of the pole portion layer 14A measured in the medium facing surface ABS is 0.3 $\mu$m, in particular, removing the electrode layer 34 formed on the side surfaces of the pole portion layer 14A by dry etching as in the comparative example would result in great variations in width and shape of the pole portion layer 14A. In contrast, according to the present embodiment, the electrode layer 34 is not formed on the side surfaces of the pole portion layer 14A near the medium facing surface ABS and therefore no variations in width and shape of the pole portion layer 14A would result from removal of the electrode layer 34.

The remainder of the structure, functions and effects of the present embodiment are similar to those of the first embodiment.

[Third Embodiment]

Figure 35:
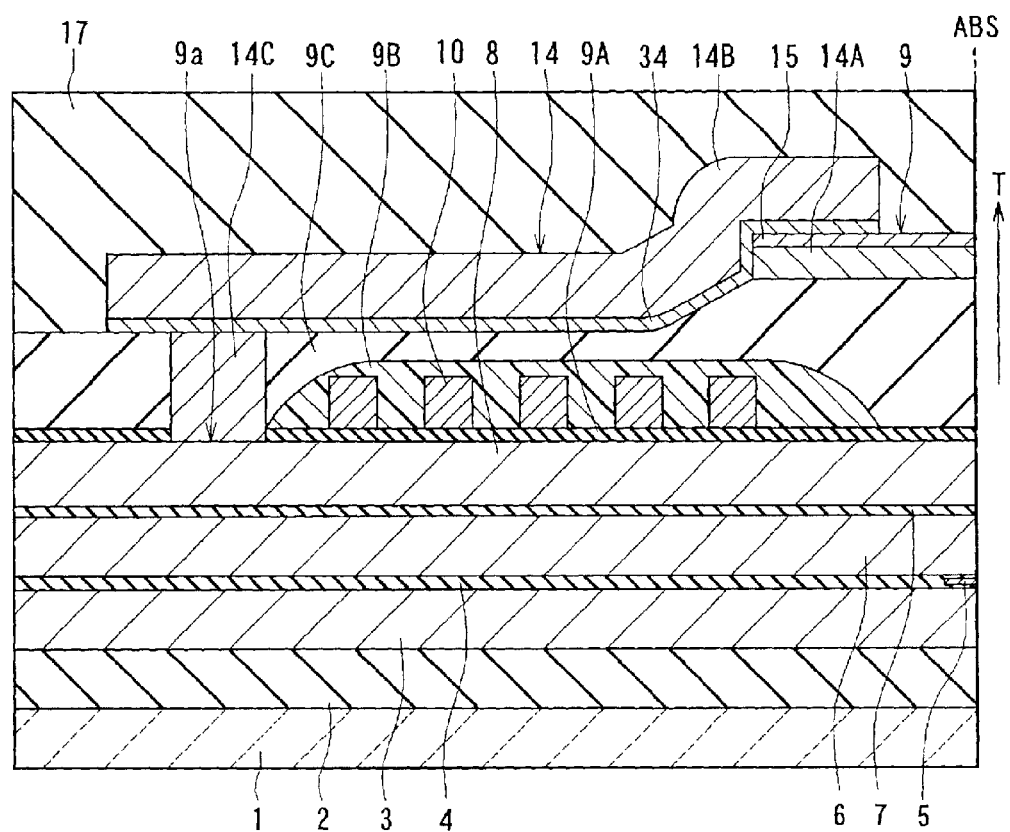
FIG. 35 is a cross-sectional view illustrating a structure of a thin-film magnetic head in a third embodiment of the invention.
Figure 36:
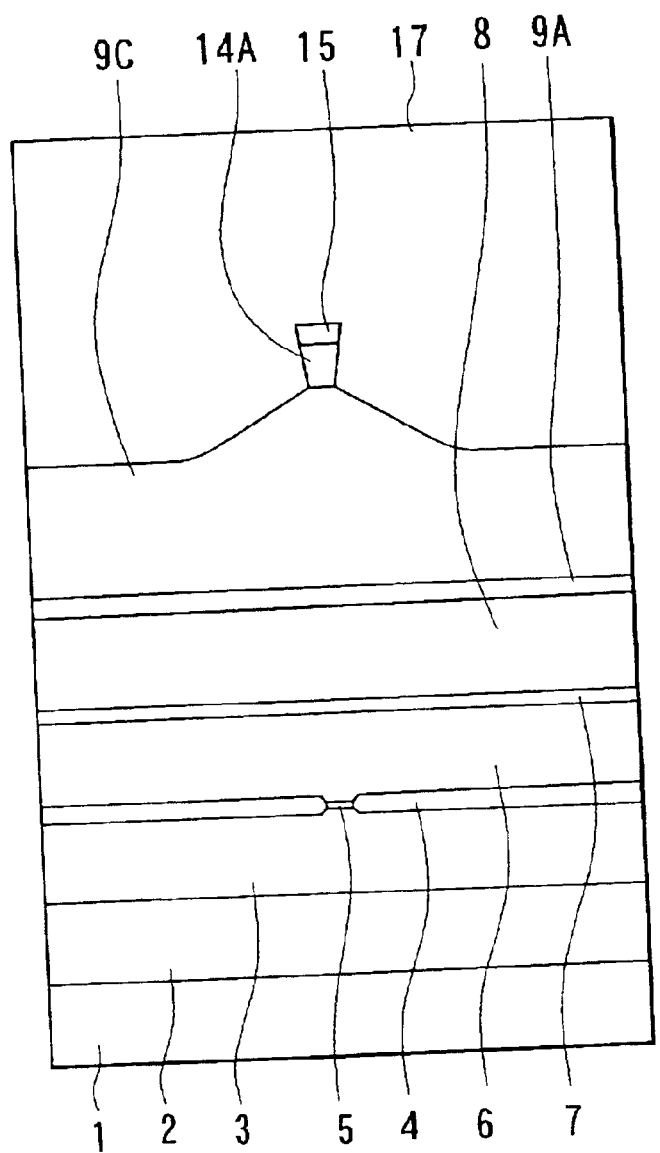
FIG. 36 is a front view illustrating the medium facing surface of the thin-film magnetic head shown in FIG. 35.
Figure 37:
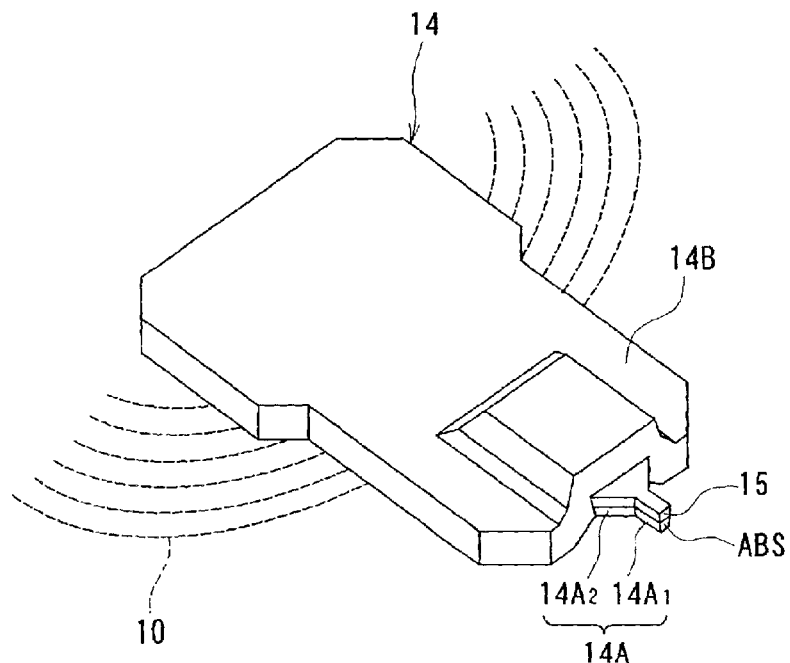
FIG. 37 is a perspective view illustrating the main part of the thin-film magnetic head shown in FIG. 35.

Now, a method of manufacturing a thin-film magnetic head according to a third embodiment of the invention is described below. To begin with, referring to FIGS. 35 to 37, explained is the structure of a thin-film magnetic head to which the method of manufacturing the thin-film magnetic head according to this embodiment is applied. The thin-film magnetic head in this embodiment is suitable for use with the vertical magnetic recording scheme. FIG. 35 is a cross-sectional view illustrating the structure of the thin-film magnetic head in this embodiment. FIG. 35 shows a cross section orthogonal to the medium facing surface and the surface of the substrate. The arrow indicated by symbol T in FIG. 35 shows the traveling direction of a recording medium. FIG. 36 is a front view illustrating the medium facing surface of the thin-film magnetic head shown in FIG. 35. FIG. 37 is a perspective view illustrating the main part of the thin-film magnetic head shown in FIG. 35.

The thin-film magnetic head in this embodiment is the same as the head disclosed in the first embodiment in the structure from the substrate 1 to the first magnetic layer 8. The thin-film magnetic head in this embodiment further comprises: an insulating layer 9A formed on the first magnetic layer 8 where the thin-film coil 10 is to be formed; the thin-film coil 10 formed on the insulating layer 9A; and an insulating layer 9B that is filled at least in between windings of the thin-film coil 10. The contact hole 9a is formed in the insulating layer 9A at a distance from the medium facing surface ABS.

The insulating layer 9A is made of a non-conductive and non-magnetic material such as alumina, and has a thickness of 0.1 to 1 $\mu$m, for example.

The thin-film coil 10 is made of a conductive material such as copper, and the winding thereof is 0.3 to 2 $\mu$m in thickness, for example. Thin-film coil 10 can have any number of turns of the winding as well as any pitch of the winding.

The insulating layer 9B is made of a non-conductive and non-magnetic material that exhibits fluidity during its formation. More specifically, the insulating layer 9B may be formed of an organic, non-conductive and non-magnetic material such as a photosensitive resist, or a spin-on-glass (SOG) film of coating glass.

The thin-film magnetic head further comprises: the coupling portion 14C made of a magnetic material and formed on a portion of the first magnetic layer 8 in which the contact hole 9a is formed; and an insulating layer 9C formed so as to cover the thin-film coil 10 and the insulating layers 9A and 9B. The thin-film coil 10 is wound around the coupling portion 14C.

For example, the coupling portion 14C has a thickness of 2 to 4 $\mu$m, a depth (or the length perpendicular to the medium facing surface ABS) of 2 to 10 $\mu$m, and a width of 5 to 20 $\mu$m For example, the magnetic material making the coupling portion 14C may be an iron-nickel-based alloy or Permalloy, or a high saturated magnetic flux density material as described later.

The insulating layer 9C is made of a non-conductive and non-magnetic material which has a better resistance to corrosion, rigidity, and insulating strength than those of the insulating layer 9B. As such a material, an inorganic, non-conductive and non-magnetic material such as alumina and silicon dioxide ($SiO_2$) may be used. The total thickness of the insulating layers 9A and 9C in the medium facing surface ABS is, for example, 2 to 4 $\mu$m. This thickness should be equal to or greater than the thickness of the coupling portion 14C.

The insulating layers 9A, 9B and 9C make up the gap layer 9 that is provided between the first magnetic layer 8 and a second magnetic layer 14 described later.

The thin-film magnetic head has the second magnetic layer 14 made of a magnetic material and formed on the insulating layer 9C. The second magnetic layer 14 has the aforementioned coupling portion 14C, the pole portion layer 14A including a magnetic pole portion, and the yoke portion layer 14B that serves as a yoke portion and magnetically connects the pole portion layer 14A and the first magnetic layer 8 to each other via the coupling portion 14C. The pole portion layer 14A is formed on the insulating layer 9C over a region extending from the medium facing surface ABS to a predetermined position located between the medium facing surface ABS and the coupling portion 14C. The yoke portion layer 14B magnetically connects an end of the coupling portion 14C farther from the first magnetic layer 8 (hereinafter referred to as the upper end) and an end surface of the pole portion layer 14A farther from the medium facing surface ABS (hereinafter referred to as the rear end surface) to each other. In addition, the yoke portion layer 14B has such a shape as allows to form a magnetic path, inside the yoke portion layer 14B, the magnetic path connecting the upper end of the coupling portion 14C and the rear end surface of the pole portion layer 14A in the shortest distance.

The thin-film magnetic head further comprises a non-magnetic layer 15 that is formed on the pole portion layer 14A. The non-magnetic layer 15 is in contact with a surface of the pole portion layer 14A that is farther from the gap layer 9. A part of the yoke portion layer 14B located near the medium facing surface ABS is adjacent to the top surface of the pole portion layer 14A via the non-magnetic layer 15, and magnetically connected to a part of the top surface of the pole portion layer 14A via the non-magnetic layer 15. The thin-film magnetic head further comprises the protective layer 17 made of a non-conductive and non-magnetic material such as alumina and formed so as to cover the second magnetic layer 14.

A surface of the thin-film coil 10 closer to the second magnetic layer 14 is located closer to the first magnetic layer 8 than an end of the gap layer 9, the end being located in the medium facing surface ABS next to the second magnetic layer 14 (or the end of the insulating layer 9C closer to the second magnetic layer 14).

The pole portion layer 14A is preferably 0.05 to 0.8 $\mu$m in thickness and more preferably 0.1 to 0.5 $\mu$m. Here, as an example, the pole portion layer 14A is 0.5 $\mu$m in thickness. The length from the medium facing surface ABS to the rear end surface of the pole portion layer 14A is 2 $\mu$m or greater.

As shown in FIG. 37, the pole portion layer 14A includes a first portion 14A, located next to the medium facing surface ABS, and a second portion $14A_2$ located farther from the medium facing surface ABS than the first portion $14A_1$. The first portion $14A_1$ is the magnetic pole portion of the second magnetic layer 14. The magnetic pole portion of the first magnetic layer 8 includes a portion of the first magnetic layer 8 that is opposed to the first portion $14A_1$ via the gap layer 9.

The first portion $14A_1$ has a width equal to the track width. That is, the width of the first portion $14A_1$ measured in the medium facing surface ABS defines the track width. The second portion $14A_2$ has a width equal to that of the first portion $14A_1$ at the interface with the first portion $14A_1$. The width of the second portion $14A_2$ gradually increases from this interface with an increase in distance from the medium facing surface ABS, and finally becomes constant. A part of the yoke portion layer 14B located near the medium facing surface ABS is laid over the second portion $14A_2$ of the pole portion layer 14A via the non-magnetic layer 15.

The width of the first portion $14A_1$ measured in the medium facing surface ABS, that is, the track width, is preferably 0.5 $\mu$m or less, and more preferably 0.3 $\mu$m or less. Here, as an example, the track width is 0.3 $\mu$m. The portion of the second portion $14A_2$ overlapping the yoke portion layer 14B has a width greater than that of the first portion $14A_1$ measured in the medium facing surface ABS, and the width is 2 $\mu$m or more, for example.

The yoke portion layer 14B has a thickness of 1 to 2 $\mu$m, for example. As shown in FIG. 35, the yoke portion layer 14B is magnetically connected to the rear end surface of the pole portion layer 14A, and, as shown in FIG. 37, is magnetically connected to the side surfaces of the pole portion layer 14A in the width direction. An end of the yoke portion layer 14B closer to the medium facing surface ABS is located at a distance of, for example, 1.5 $\mu$m or more from the medium facing surface ABS.

The pole portion layer 14A has a saturated magnetic flux density equal to or greater than that of the yoke portion layer 14B. As the magnetic material to form the pole portion layer 14A, it is preferable to use a high saturated magnetic flux density material having a saturated magnetic flux density of 1.4 T or more. For example, as the high saturated magnetic flux density material, available are a material containing iron and nitrogen atoms, a material containing iron, zirconia and oxygen atoms, and a material containing iron and nickel elements. More specifically, for example, as the high saturated magnetic flux density material, it is possible to use at least one of NiFe (Ni: 45 wt %, Fe: 55 wt %), FeN and its compounds, Co-based amorphous alloys, Fe—Co, Fe—M (including oxygen atoms as required), and Fe—CO—M (including oxygen atoms as required). In the foregoing, M is at least one element selected from the group consisting of Ni, N, C, B, Si, Al, Ti, Zr, Hf, Mo, Ta, Nb, and Cu (all of which stand for chemical elements).

As the magnetic material to form the yoke portion layer 14B, it is possible to use a material containing iron and nickel elements and having a saturated magnetic flux density of the order of 1.0 T, for example. Such a material has a good resistance to corrosion and a higher resistance than that of the material to form the pole portion layer 14A. Use of such a material will facilitate formation of the yoke portion layer 14B.

To form the yoke portion layer 14B, it is also possible to use a magnetic material that is the same in compositional family as the magnetic material used to form the pole portion layer 14A. In this case, to make the saturated magnetic flux density of the yoke portion layer 14B lower than that of the pole portion layer 14A, it is preferable to use, as the magnetic material for forming the yoke portion layer 14B, a material having a lower compositional ratio of iron atoms than that of the magnetic material used to form the pole portion layer 14A.

The non-magnetic layer 15 is identical to the pole portion layer 14A in planar shape. In addition, the non-magnetic layer 15 is exposed in the medium facing surface ABS. The non-magnetic layer 15 is preferably 0.5 $\mu$m or less in thickness. Here, as an example, the non-magnetic layer 15 is 0.2 $\mu$m in thickness. It is also possible to omit the non-magnetic layer 15.

To form the non-magnetic layer 15, it is possible to use a material containing titanium or tantalum (including their alloys and oxides) or an inorganic non-magnetic material such as alumina or silicon dioxide ($SiO_2$), for example. In the case of forming the pole portion layer 14A by dry etching, it is preferable that the non-magnetic layer 15 is formed of a material having a lower etching rate for the dry etching than that of the material to form the pole portion layer 14A. Examples of such a material include materials containing titanium or tantalum (including their alloys and oxides).

As shown in FIG. 37, the surface of the pole portion layer 14A exposed in the medium facing surface ABS preferably has a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. It is also preferable that the side of the surface of the pole portion layer 14A exposed in the medium facing surface ABS forms an angle of 92 to 110 degrees relative to the surface of the pole portion layer 14A closer to the gap layer 9.

As described above, the thin-film magnetic head in this embodiment comprises the medium facing surface ABS that faces toward the recording medium, a read head, and a write head (an induction-type electromagnetic transducer).

The write head comprises: the first magnetic layer 8 and the second magnetic layer 14 that are magnetically coupled to each other at a distance from the medium facing surface ABS, and include magnetic pole portions disposed on a side of the medium facing surface ABS so as to oppose to each other with a predetermined spacing interposed therebetween along the traveling direction T of the recording medium; the gap layer 9 made of a non-magnetic material and provided between the first magnetic layer 8 and the second magnetic layer 14; and the thin-film coil 10 at least a part of which is disposed between the first magnetic layer 8 and the second magnetic layer 14 and insulated from the magnetic layers 8 and 14. The thin-film coil 10 generates a magnetic field associated with information to be written on the recording medium.

The second magnetic layer 14 defines a track width, allows a magnetic flux to pass therethrough, the magnetic flux corresponding to the magnetic field generated by the thin-film coil 10, and generates a magnetic field for writing the information on the recording medium. The second magnetic layer 14 comprises: the pole portion layer 14A that has an end exposed in the medium facing surface ABS and generates the magnetic field for writing the information on the recording medium from this end, the width of this end defining a track width; the yoke portion layer 14B that is not exposed in the medium facing surface ABS, that is magnetically connected to the pole portion layer 14A and introduces the magnetic flux corresponding to the magnetic field generated by the thin-film coil 10 into the pole portion layer 14A; and the coupling portion 14C that magnetically couples the yoke portion layer 14B and the first magnetic layer 8 to each other. The yoke portion layer 14B is magnetically connected to the rear end surface of the pole portion layer 14A and both side surfaces of the pole portion layer 14A in the width direction. The pole portion layer 14A has a saturated magnetic flux density equal to or greater than that of the yoke portion layer 14B.

According to the thin-film magnetic head in this embodiment, the second magnetic layer 14 has the pole portion layer 14A and the yoke portion layer 14B. This makes it possible to reduce the track width without decreasing the intensity of the magnetic field to be applied to the recording medium.

In the thin-film magnetic head in this embodiment, the surface of the pole portion layer 14A exposed in the medium facing surface ABS preferably has a shape of a trapezoid or a triangle in which the lower side located on the trailing side in the traveling direction T of the recording medium (or on the air-inflow-end side of the slider) is shorter than the upper side. In addition, the side surfaces of the pole portion layer 14A may be concave. If a thin-film magnetic head having the pole portion layer 14A of such a shape is employed for the vertical magnetic recording scheme, it is possible to prevent a variation in write track width when a skew angle is developed.

The thin-film magnetic head in this embodiment is suitable for use with the vertical magnetic recording scheme. When this thin-film magnetic head is used for the vertical magnetic recording scheme, the first portion 14A₁ of the pole portion layer 14A of the second magnetic layer 14 serves as a main magnetic pole, while the magnetic pole portion of the first magnetic layer 8 serves as an auxiliary magnetic pole. When the thin-film magnetic head in this embodiment is used for the vertical magnetic recording scheme, it is possible to use either a two-layered medium or a single-layered medium as the recording medium.

According to the thin-film magnetic head in this embodiment, the second magnetic layer 14 has the pole portion layer 14A and the yoke portion layer 14B, wherein the yoke portion layer 14B has a volume sufficient to introduce the magnetic flux into the pole portion layer 14A, and the pole portion layer 14A has a saturated magnetic flux density equal to or greater than that of the yoke portion layer 14B. It is therefore possible to prevent the magnetic flux from being saturated halfway through the second magnetic layer 14.

In the thin-film magnetic head in this embodiment, a part of the thin-film coil 10 is disposed between the magnetic layers 8 and 14, and the surface of that part closer to the second magnetic layer 14 is located closer to the first magnetic layer 8 than the end of the gap layer 9 located in the medium facing surface ABS next to the second magnetic layer 14, and also than the upper end of the coupling portion 14C. In addition, the yoke portion layer 14B magnetically connects the upper end of the coupling portion 14C and the rear end surface of the pole portion layer 14A to each other. Accordingly, the yoke portion layer 14B can form a strong magnetic coupling between the coupling portion 14C and the pole portion layer 14A in a short magnetic path.

With these features as described in the foregoing, the thin-film magnetic head in this embodiment can increase the intensity of magnetic field generated from the magnetic pole portion of the second magnetic layer 14 in the direction perpendicular to the surface of the recording medium, and reduce the magnetic path length, thereby improving the high-frequency characteristics. In particular, when the pole portion layer 14A is formed of a high saturated magnetic flux density material, it is possible to especially increase the magnetic field in the direction perpendicular to the surface of the recording medium, and it is thereby possible to write data on a recording medium having an enhanced coercivity.

In the thin-film magnetic head in this embodiment, the magnetic field generated in the direction perpendicular to the surface of the recording medium is greater than a magnetic field in the longitudinal direction, and therefore the magnetic energy generated by the head can be transferred efficiently to the recording medium. Accordingly, this thin-film magnetic head makes it possible to easily write data on a vertical recording medium which has an enhanced coercivity and is made impervious to heat fluctuations, thereby increasing the linear recording density for magnetic write operations.

Furthermore, as shown in FIG. 37, in the thin-film magnetic head in this embodiment, the yoke portion layer 14B is magnetically connected to the rear end surface of the pole portion layer 14A and both side surfaces of the pole portion layer 14A in the width direction. It is thereby possible to obtain a greater area of a connecting portion where the yoke portion layer 14B and the pole portion layer 14A are connected to each other, even if the pole portion layer 14A is small in volume. This prevents the magnetic flux from being saturated at this connecting portion. Consequently, it is possible to efficiently introduce the magnetic flux from the yoke portion layer 14B into the pole portion layer 14A, and to thereby increase the intensity of magnetic field applied to the recording medium.

Furthermore, as shown in FIG. 35, in the thin-film magnetic head in this embodiment, the end of the yoke portion layer 14B closer to the medium facing surface ABS is located at a distance from the medium facing surface ABS. This makes it possible to prevent the magnetic field, generated from the end of the yoke portion layer 14B closer to the medium facing surface ABS, from causing writing of information on the recording medium.

Furthermore, as shown in FIG. 37, in the thin-film magnetic head in this embodiment, the portion of the pole portion layer 14A that is in contact with the yoke portion layer 14B has a width greater than the width of the pole portion layer 14A measured in the medium facing surface ABS. This allows the portion of the pole portion layer 14A that is in contact with the yoke portion layer 14B to be large in area, and thereby makes it possible to prevent a saturation of magnetic flux at this portion. Consequently, it is possible to efficiently introduce the magnetic flux from the yoke portion layer 14B into the pole portion layer 14A. Furthermore, a portion of the pole portion layer 14A exposed in the medium facing surface ABS can be made smaller in area, to make it possible to increase the intensity of magnetic field applied to the recording medium.

In the thin-film magnetic head in this embodiment, since the non-magnetic layer 15 is exposed in the medium facing surface ABS, the end of the pole portion layer 14A farther from the gap layer 9 can be kept flat in the medium facing surface ABS. This allows the magnetic field generated from the pole portion layer 14A in the medium facing surface ABS to be made uniform in the direction intersecting the track. Consequently, it is possible to prevent the bit pattern of the recording medium from being distorted in shape, and to thereby improve the linear recording density.

Now, referring to FIGS. 38 to 49, the method of manufacturing the thin-film magnetic head according to this embodiment will be described. In FIGS. 38 to 49, the substrate 1 to the non-magnetic layer 7 are not shown.

The method of manufacturing the thin-film magnetic head according to this embodiment employs the same steps as those of the first embodiment up to the step of forming the first magnetic layer 8.

Figure 38:
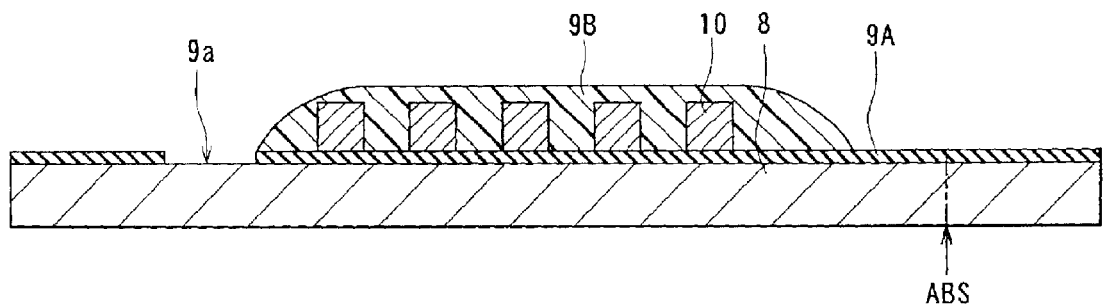
FIG. 38 is a cross-sectional view illustrating a step of a method of manufacturing the thin-film magnetic head according to the third embodiment of the invention.

Then, in this embodiment, as shown in FIG. 38, a non-conductive and non-magnetic material such as alumina is sputtered onto the first magnetic layer 8 to form the insulating layer 9A. Subsequently, through the use of well-known photolithography and dry etching techniques, the contact hole 9a is formed in the insulating layer 9A where the coupling portion 14C is to be formed. Then, the thin-film coil 10 is formed on the insulating layer 9A with a well-known photolithography technique and a well-known deposition technique (e.g., electroplating). Then, with a well-known photolithography technique the insulating layer 9B is formed to fill at least spaces between the windings of the thin-film coil 10.

Figure 39:
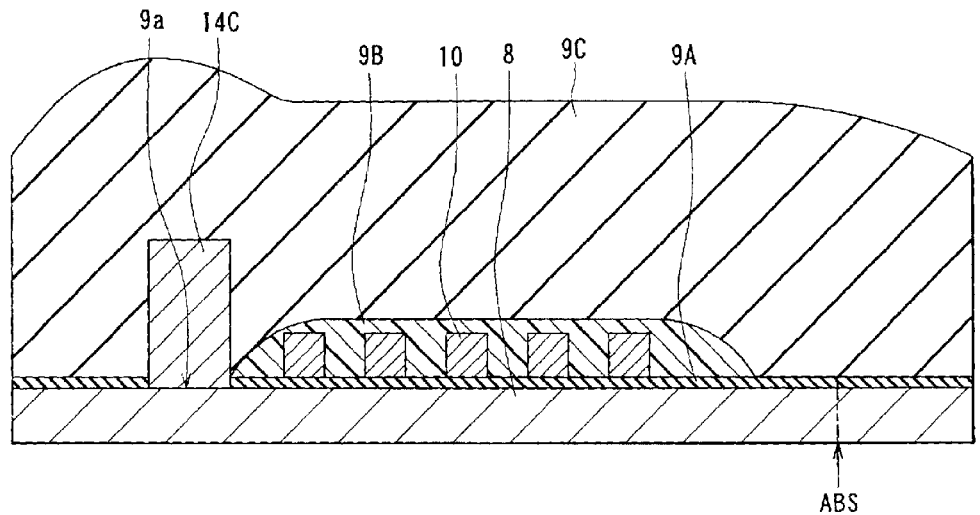
FIG. 39 is a cross-sectional view illustrating a step that follows FIG. 38.

Then, as shown in FIG. 39, with a well-known photolithography technique and a well-known deposition technique (e.g., electroplating), the coupling portion 14C is formed on the first magnetic layer 8 where the contact hole 9a is formed. For example, the coupling portion 14C has a thickness of 2 to 4 μm. Then, the insulating layer 9C is formed by sputtering, so as to cover the thin-film coil 10, the insulating layer 9A, the insulating layer 9B and the coupling portion 14C. At this stage, the insulating layer 9C may have a thickness sufficiently enough to cover the coupling portion 14C, and the thickness may be 5 μm, for example.

Figure 40:
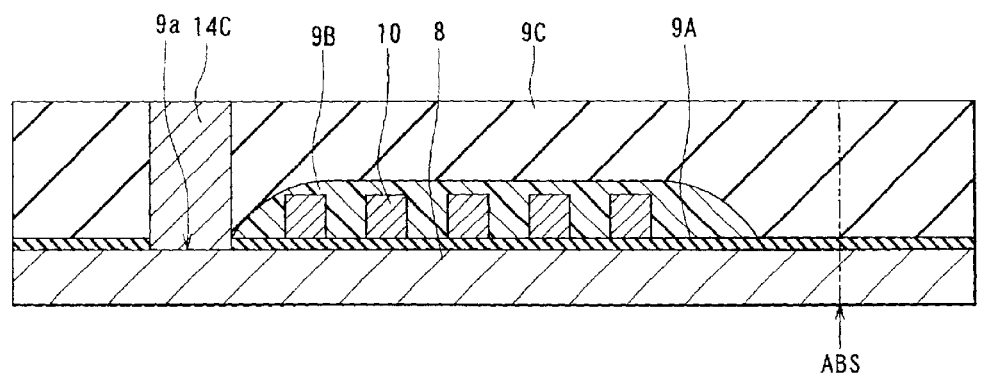
FIG. 40 is a cross-sectional view illustrating a step that follows FIG. 39.

Then, as shown in FIG. 40, the top surfaces of the insulating layer 9C and the coupling portion 14C are flattened by chemical mechanical polishing, for example. At this stage, the distance from the top surface of the first magnetic layer 8 to the top surfaces of the insulating layer 9C and coupling portion 14C is 2 to 4 μm, for example. The coupling portion 14C is not necessarily required to be exposed at this stage, but may be exposed in a later step. The total thickness of the insulating layer 9A and the insulating layer 9C in the medium facing surface is a gap length of the write head (induction-type electromagnetic transducer).

Figure 41:
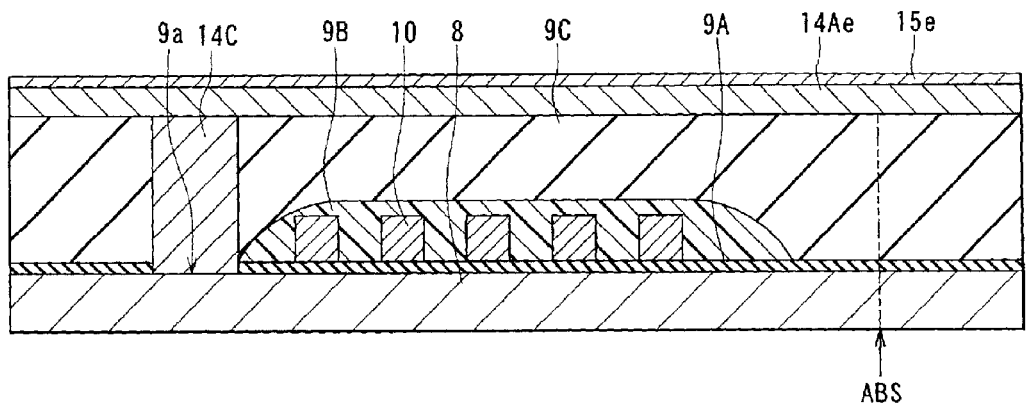
FIG. 41 is a cross-sectional view illustrating a step that follows FIG. 40.

Then, as shown in FIG. 41, on the insulating layer 9C and the coupling portion 14C, a layer 14Ae to be etched is formed of a material for forming the pole portion layer 14A. The layer 14Ae preferably has a thickness of 0.1 to 0.8 μm, and more preferably a thickness of 0.3 to 0.8 μm. The layer 14Ae may be formed by electroplating or sputtering. If the layer 14Ae has a high surface roughness (e.g., its arithmetic mean roughness Ra is equal to or greater than 12 angstroms), it is preferable to polish the surface of the layer 14Ae through chemical mechanical polishing or the like, so as to flatten the surface.

Then, a non-magnetic layer 15e is formed on the layer 14Ae. The non-magnetic layer 15e is preferably equal to or less than 0.5 μm in thickness.

Then, although not shown, an electrode layer for electroplating is formed by sputtering on the non-magnetic layer 15e. The electrode layer is equal to or less than 0.1 μm in thickness and made of an iron-nickel alloy, for example.

Figure 42:
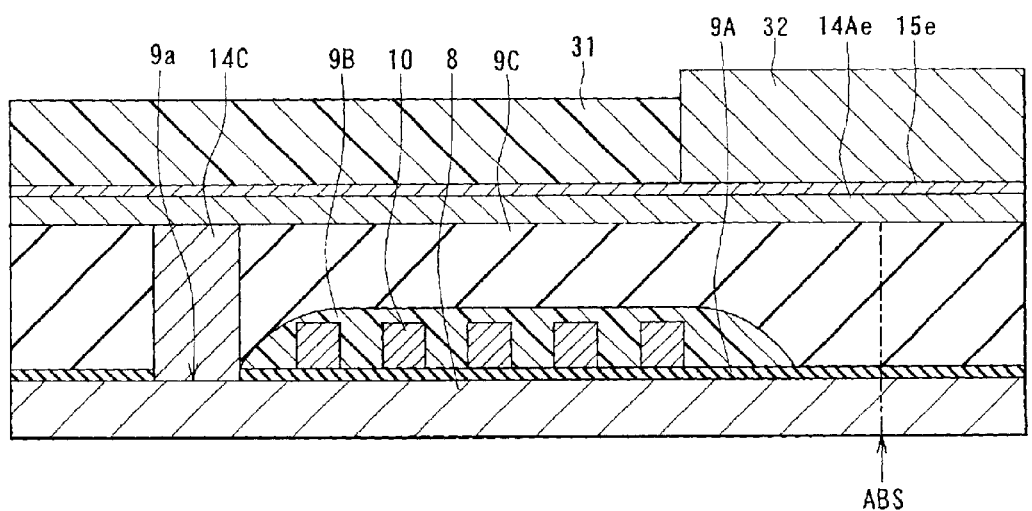
FIG. 42 is a cross-sectional view illustrating a step that follows FIG. 41.

Then, as shown in FIG. 42, a frame 31, which has a gap portion corresponding to the shape of the pole portion layer 14A, is formed of a photosensitive resist on the aforementioned electrode layer by photolithography. Using the frame 31, a plating film that serves as a mask 32 corresponding to the shape of the pole portion layer 14A is formed on the aforementioned electrode layer by electroplating (frame plating). This plating film is 1 to 4 μm in thickness and made of an iron-nickel alloy, for example. The frame 31 is then removed.

Figure 43:
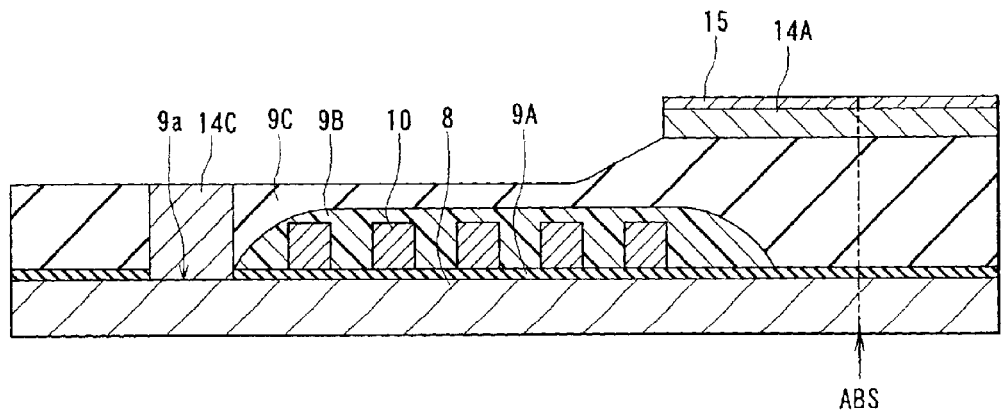
FIG. 43 is a cross-sectional view illustrating a step that follows FIG. 42.

Next, as shown in FIG. 43, using the mask 32, the non-magnetic layer 15e and the layer 14Ae are etched by dry etching such as ion milling, to define the outer shapes of the non-magnetic layer 15 and the pole portion layer 14A. At this stage, in the mask 32, at least the portion corresponding to the medium facing surface ABS is preferably removed completely, except in the case where the mask 32 is non-magnetic and sufficiently reliable in terms of resistance to corrosion and the like.

Through the aforementioned etching, the surface of the pole portion layer 14A exposed in the medium facing surface ABS is allowed to have a shape as shown in FIG. 36. It may have a shape of a rectangle, or a shape of a trapezoid or a triangle in which the lower side is shorter than the upper side. The side surfaces of the pole portion layer 14A may be concave. Also, through the aforementioned etching, the width of the pole portion layer 14 in the medium facing surface ABS may be defined so as to agree with the specification of the track width. To form the surface of the pole portion layer exposed in the medium facing surface ABS into a shape of a trapezoid whose lower side is shorter than the upper side through the use of, for example, ion milling as the etching method, ion irradiation may be performed in a direction inclined with respect to the direction perpendicular to the surface of the substrate (or to the surfaces of the non-magnetic layer 15 and the pole portion layer 14A).

Through the aforementioned etching, the outer shapes of the non-magnetic layer 15 and the pole portion layer 14A are defined and the coupling portion 14C is exposed. In order for the coupling portion 14C to be exposed at this stage, the coupling portion 14C should previously have a greater thickness than desired.

Instead of forming the mask 32 of the plating film as described above, a photoresist may be formed into a patterned resist corresponding to the shape of the pole portion layer 14A on the non-magnetic layer 15e through photolithography. Then, this patterned resist may be used as a mask to etch the non-magnetic layer 15e and the layer 14Ae, so as to define the outer shapes of the non-magnetic layer 15 and the pole portion layer 14A and to expose the coupling portion 14C. Thereafter, the patterned resist may be removed.

Figure 44:
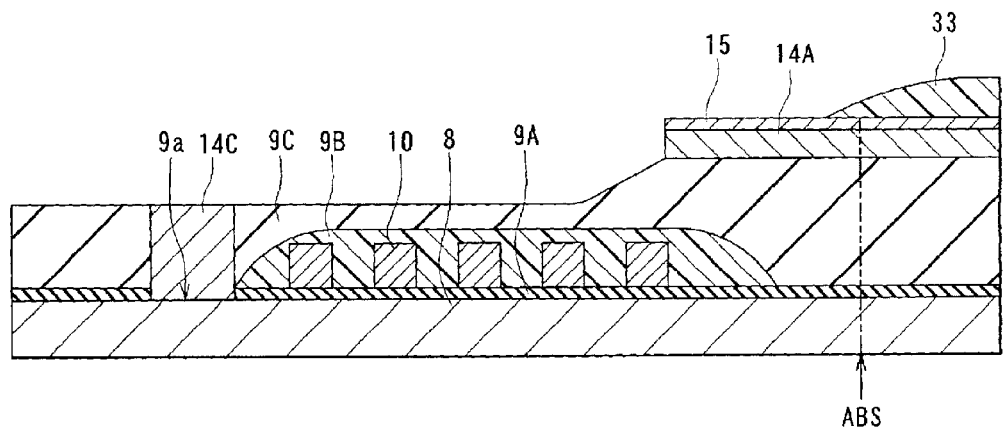
FIG. 44 is a cross-sectional view illustrating a step that follows FIG. 43.

Then, as shown in FIG. 44, the protective layer 33 is formed by photolithography so as to cover part of the pole portion layer 14A and the non-magnetic layer 15 located near the medium facing surface ABS. The protective layer 33 is formed so as to cover not only the top surface of the non-magnetic layer 15 but also both side surfaces of the pole portion layer 14A near the medium facing surface ABS.

As the material of the protective layer 33, an organic material such as a photosensitive resist or an inorganic material such as alumina may be used. However, since it is preferable to remove the protective layer 33 in a later step, an easily removable material such as a photosensitive resist may be preferably used as the material of the protective layer 33. Use of a photosensitive resist as the material of the protective layer 33 makes it possible to easily form the protective layer 33 by photolithography only on a part of the pole portion layer 14A located near the medium facing surface ABS, and also makes it possible to easily remove the protective layer 33 using a solvent.

In a later step, as described later, the electrode layer 34 is removed by dry etching. In order to easily remove the electrode layer 34 in that step, it is preferable that the protective layer 33 is formed to have blunt edges or, for example, a curved top surface, as shown in FIG. 44. If a photosensitive resist is used as the material of the protective layer 33, it is possible to form the protective layer 33 with blunt edges by going through the steps of forming a patterned resist by photolithography and then allowing the photosensitive resist to reflow by heating and the like. In this case, it is preferable that the photosensitive resist to be used exhibits a good fluidity.

If an inorganic material such as alumina is used as the material of the protective layer 33, it is possible to form the protective layer 33 with blunt edges through the use of liftoff method.

It is preferable to form the protective layer 33 within a region where a frame 35, which is used to form the yoke portion layer 14B, to be described later, is formed. It is also preferable that the protective layer 33 has a thickness equal to or less than that of the frame 35. Here, as an example, the protective layer 33 is 3.5 $\mu$m in thickness.

Figure 45:
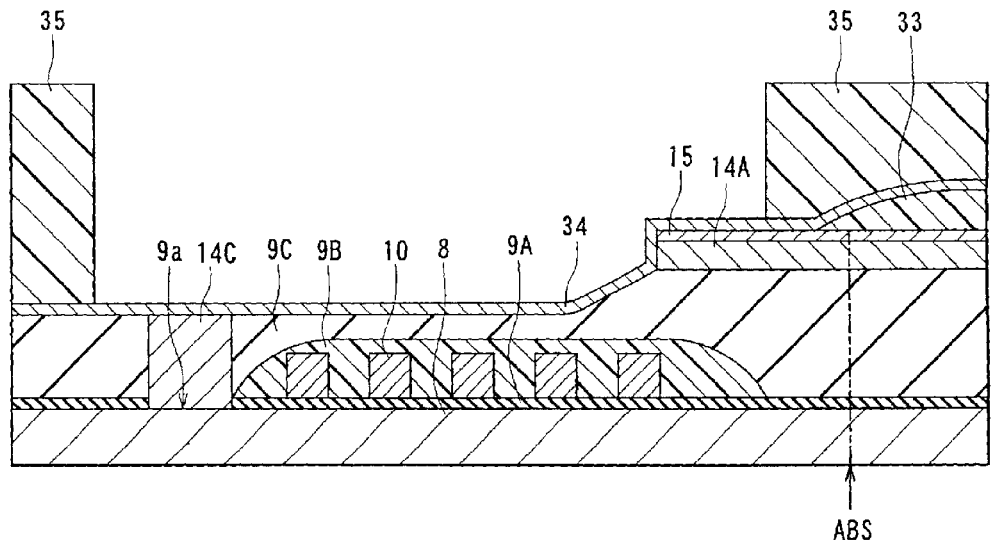
FIG. 45 is a cross-sectional view illustrating a step that follows FIG. 44.

Then, as shown in FIG. 45, the electrode layer 34 for electroplating is formed through sputtering on the protective layer 33, the pole portion layer 14A (and the non-magnetic layer 15), the insulating layer 9C (the gap layer 9) and the coupling portion 14C. For example, to form the electrode layer 34, a Ti (titanium) layer serving as its base is first deposited and then a layer made of the same material as that of the yoke portion layer 14B is formed on the Ti layer. For example, the electrode layer 34 has a thickness of 0.1 $\mu$m or less.

Then, the frame 35, which has a gap portion corresponding to the shape of the yoke portion layer 14B, is formed of a photosensitive resist by photolithography on the electrode layer 34. The frame 35 preferably has a thickness equal to or greater than the yoke portion layer 14B. It is also preferable that the thickness of the frame 35 is equal to or greater than that of the protective layer 33. This is to prevent formation of a plating layer on the electrode layer 34 formed on the protective layer 33. Here, as an example, the thickness of the frame 35 is 7 $\mu$m or more.

Figure 46:
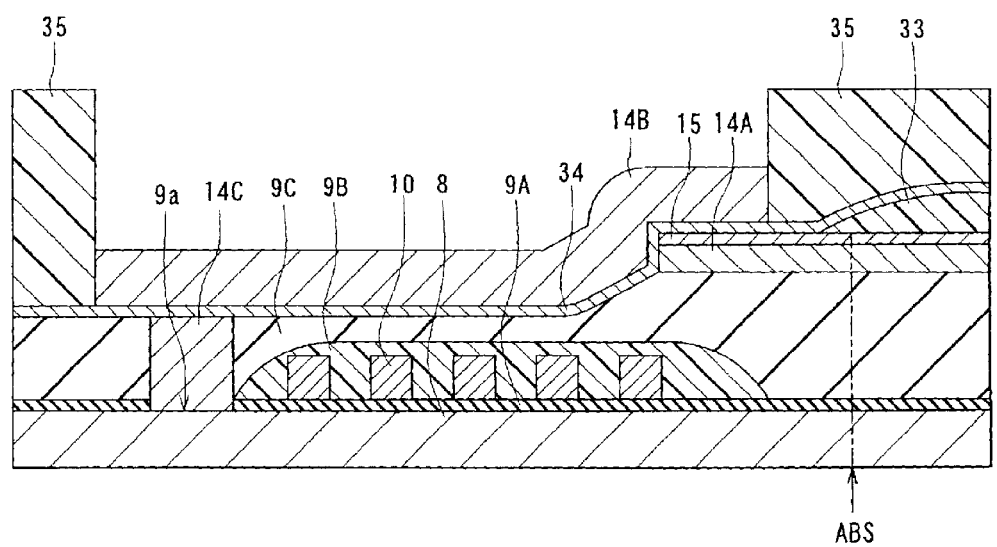
FIG. 46 is a cross-sectional view illustrating a step that follows FIG. 45.

Then, as shown in FIG. 46, using the frame 35, the yoke portion layer 14B is formed on the electrode layer 34 through electroplating (or frame plating).

Figure 47:
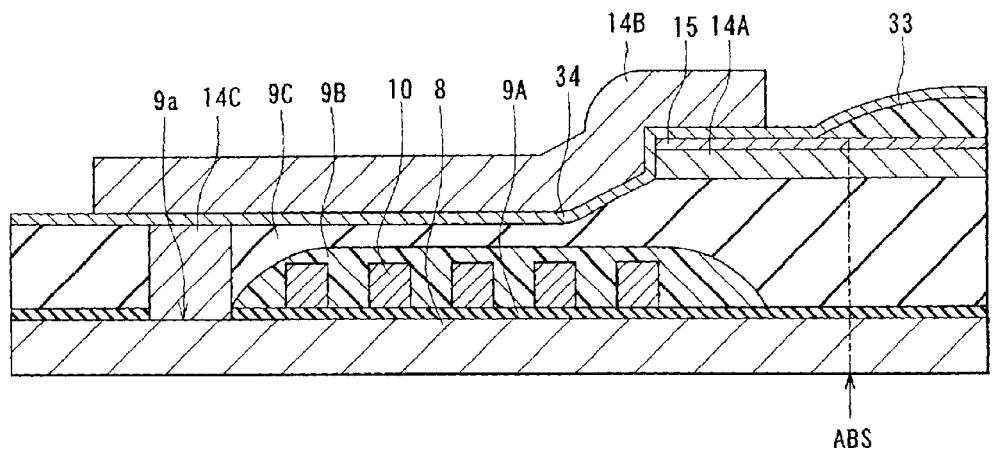
FIG. 47 is a cross-sectional view illustrating a step that follows FIG. 46.

Then, as shown in FIG. 47, the frame 35 is removed using a solvent. At this time, the protective layer 33 underlies the electrode layer 34 and is therefore not removed.

Figure 48:
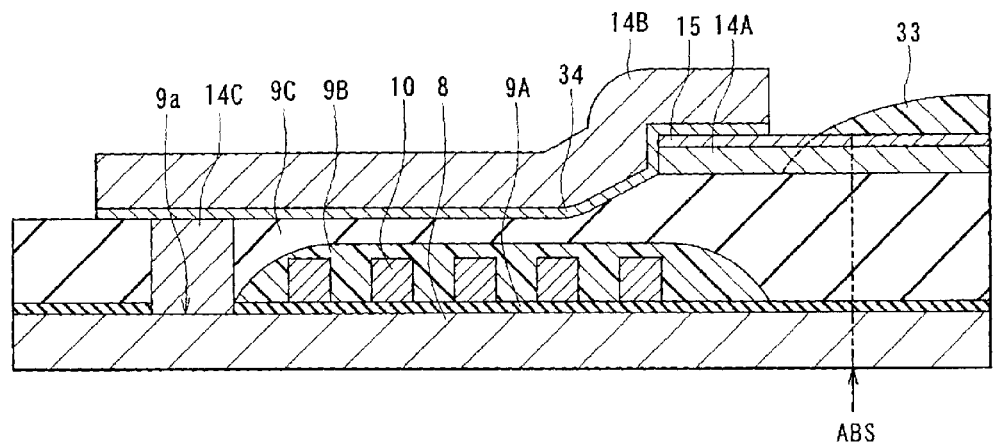
FIG. 48 is a cross-sectional view illustrating a step that follows FIG. 47.

Then, as shown in FIG. 48, an unnecessary portion of the electrode layer 34, that is, the portion that has been present under the frame 35, is removed through dry etching. The protective layer 33 is thereby exposed. In some cases, this may cause the surface of the protective layer 33 to be hardened due to the ion energy of the dry etching. However, after the dry etching, subjecting the surface of the protective layer 33 to ashing through the use of oxygen plasma, for example, will make it easier to remove the protective layer 33 in a later step.

Then, although not shown, the plating layer formed on the unnecessary portion is removed through wet etching as in the first embodiment. That is, a cover of a resist is first formed using photolithography, so as to cover the yoke portion layer 14B. At this time, the protective layer 33 is covered with the cover. Then, wet etching is performed to remove the plating layer formed on the unnecessary portion. If the electrode layer 34 is made of an easily-etchable material, such as a material the same as that of the plating layer, it is also possible, in the step of the wet etching, to remove the electrode layer 34 which underlies the plating layer.

Figure 49:
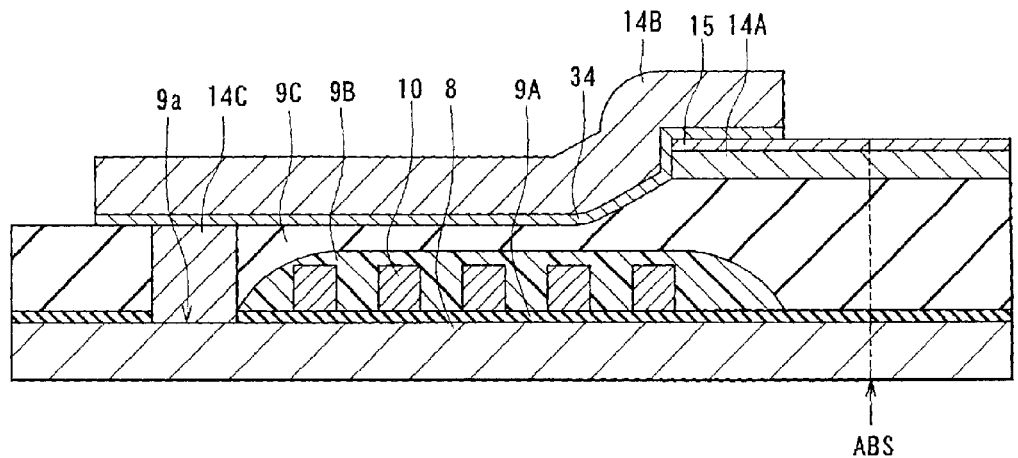
FIG. 49 is a cross-sectional view illustrating a step that follows FIG. 48.

Then, the aforementioned cover is removed using a solvent. The protective layer 33 is also removed at this time, as shown in FIG. 49. If the protective layer 33 is made of an inorganic material such as alumina, removal of the protective layer 33 is not necessarily required. Then, although not shown, part of the unnecessary portion of the electrode layer 34 that could not be removed by the wet etching, that is, for example, the Ti layer as the base of the electrode layer 34, is removed through dry etching.

Then, as shown in FIG. 35, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

Figure 50:
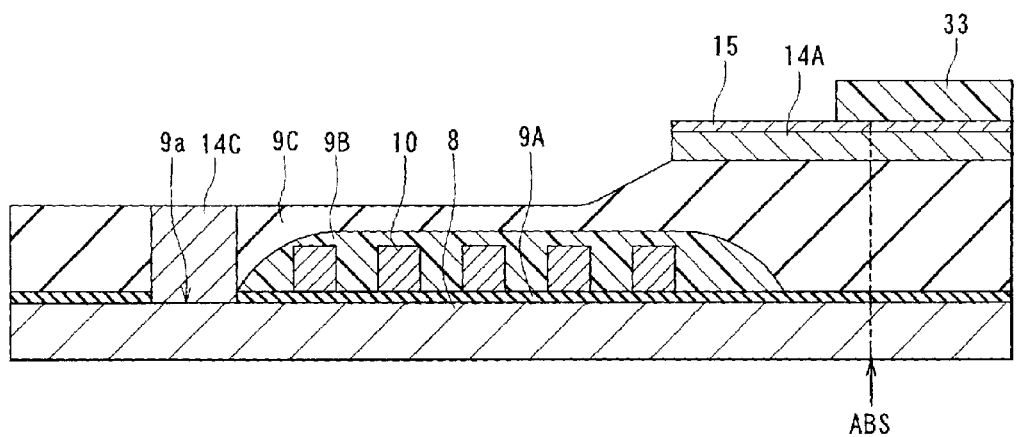
FIG. 50 is a cross-sectional view illustrating a step of a method of manufacturing a thin-film magnetic head of a comparative example against the third embodiment of the invention.
Figure 51:
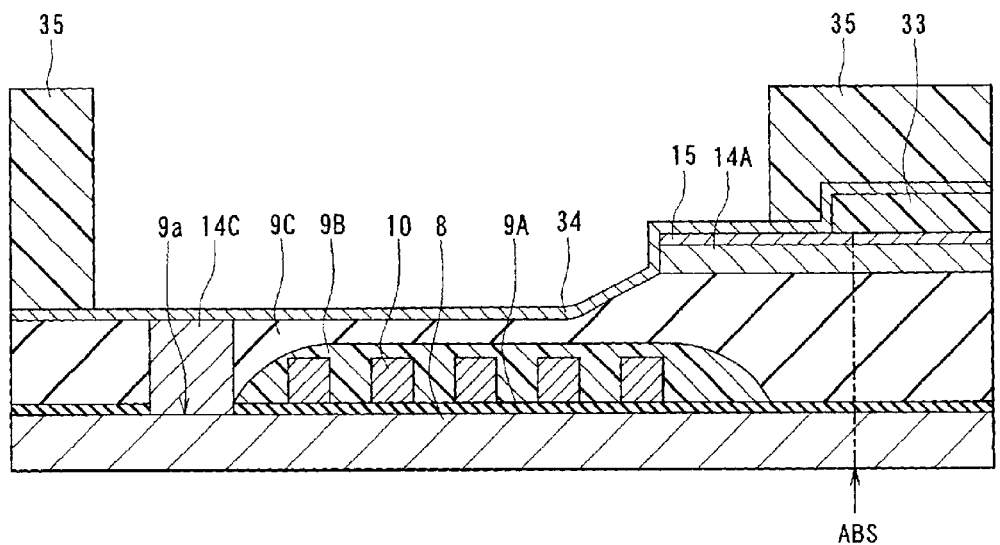
FIG. 51 is a cross-sectional view illustrating a step that follows FIG. 50.
Figure 52:
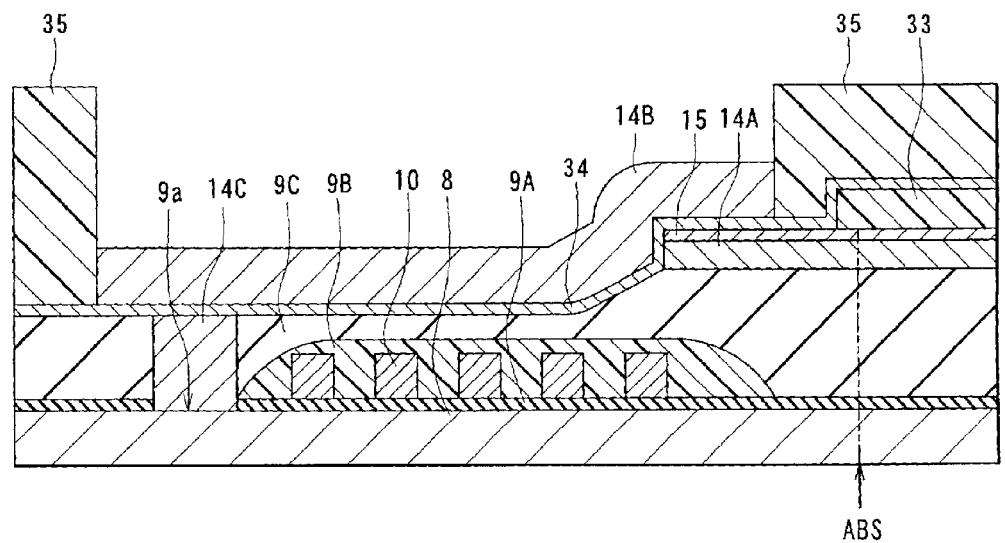
FIG. 52 is a cross-sectional view illustrating a step that follows FIG. 51.

Now, referring to FIGS. 50 to 52, briefly explained below is a method of manufacturing a thin-film magnetic head in the case where the protective layer 33 disclosed in the present embodiment has a rectangular shape in cross section. FIG. 50 illustrates the same step as that shown in FIG. 44, FIG. 51 illustrates the same step as that shown in FIG. 45, and FIG. 52 illustrates the same step as that shown in FIG. 46. The method of manufacturing a thin-film magnetic head in the case where the protective layer 33 has a rectangular shape in cross section is the same as the method shown in FIGS. 38 to 49 except that the shape of the protective layer 33 is different.

Figure 53:
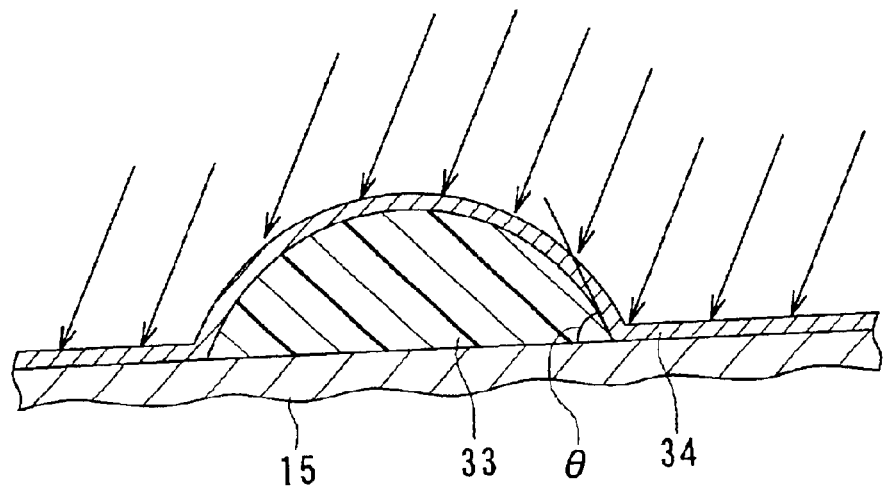
FIG. 53 is an explanatory view illustrating a state in which the electrode layer formed around the protective layer with blunt edges is being removed by ion milling.
Figure 54:
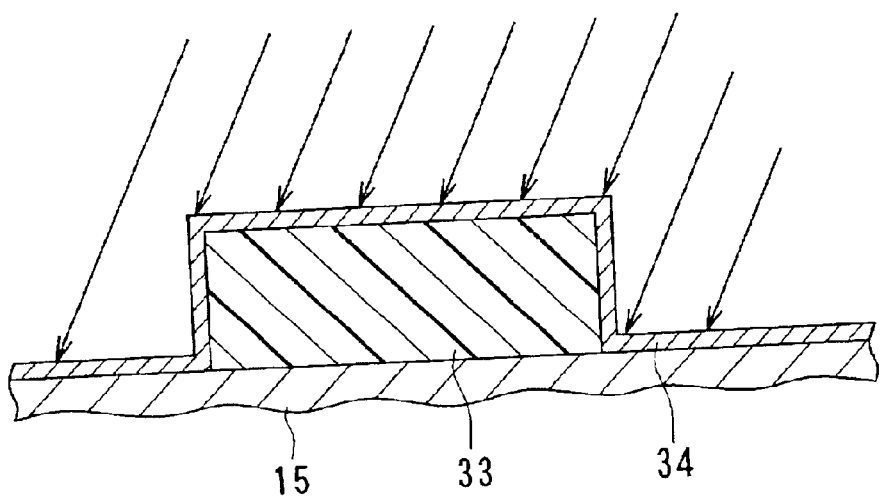
FIG. 54 is an explanatory view illustrating a state in which the electrode layer formed around the protective layer having a rectangular shape in cross section is being removed by ion milling.

Now, referring to FIGS. 53 and 54, described below is the difference in easiness of removing the electrode layer 34 formed around the protective layer 33 between the cases where the protective layer 33 has blunt edges and where the protective layer 33 has a rectangular shape in cross section. FIG. 53 illustrates a state in which the electrode layer 34 formed around the protective layer 33 with blunt edges is being removed by ion milling. FIG. 54 illustrates a state in which the electrode layer 34 formed around the protective layer 33 having a rectangular shape in cross section is being removed by ion milling. The removal of the electrode layer 34 formed around the protective layer 33 is carried out after the yoke portion layer 14B has been formed and the frame 35 has been removed.

The arrows in FIGS. 53 and 54 indicate the flow of ions in the ion milling. The ion irradiation is preferably performed at an angle of 10 to 60 degrees with respect to the normal to the substrate. In each of FIGS. 53 and 54, ions are projected from the upper right toward the lower left. In this case, when the protective layer 33 has a rectangular shape in cross section, as shown in FIG. 54, a portion on the left of the protective layer 33 may not be hit by ions. Accordingly, it is difficult to remove the electrode layer 34 formed on the left-side surface of the protective layer 33. Furthermore, in the case shown in FIG. 54, on the right-side surface of the protective layer 33, the substance forming the electrode layer 34 is apt to redeposit on the protective layer 33 after having been removed from the protective layer 33. Accordingly, in the case shown in FIG. 54, the substance forming the electrode layer 34 is apt to remain on the side surfaces of the protective layer 33 even if the electrode layer 34 is etched through ion milling while the substrate is being rotated. It is very difficult to strip off the substance, and it will remain as burrs even after the protective layer 33 has been removed.

In contrast, if the protective layer 33 has blunt edges as shown in FIG. 53, it is unlikely that ions will not hit some portions of the electrode layer 34 formed around the protective layer 33 and that the substance forming the electrode layer 34 will re-deposit on the protective layer 33 after having been removed from the protective layer 33. Accordingly, the protective layer 33 with blunt edges makes it easier to remove the electrode layer 34 formed around the protective layer 33. As shown in FIG. 53, at the interface between the protective layer 33 and the non-magnetic layer 15 that is the base of the protective layer 33, the angle $\theta$ between the plane in contact with the surface of the protective layer 33 and the top surface of the non-magnetic layer 15 (the angle between the side surface of the protective layer 33 and the top surface of the non-magnetic layer 15) is preferably an acute angle, and more preferably 20 to 60 degrees. This makes it possible to prevent burrs from developing upon removing the unnecessary portion of the electrode layer 34.

Figure 55:
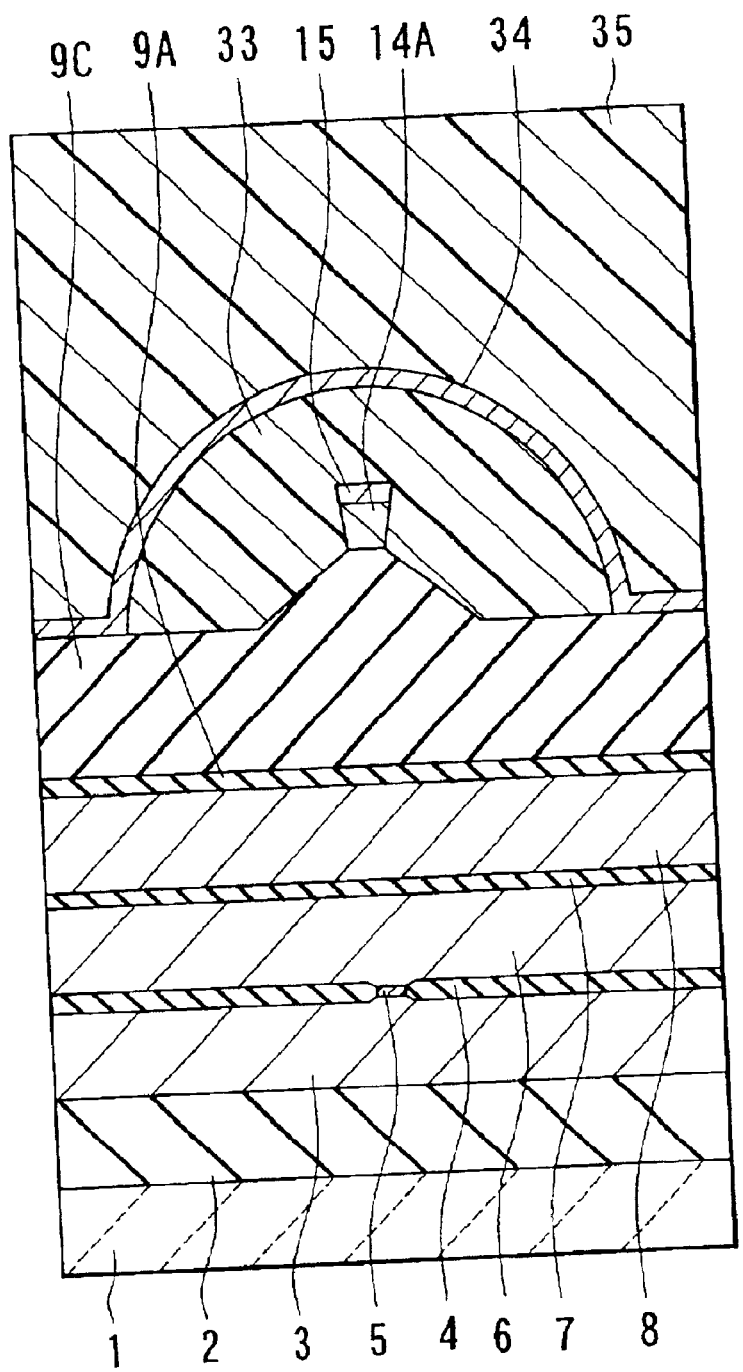
FIG. 55 is a cross-sectional view illustrating the cross section of the medium facing surface in the state shown in FIG. 45.
Figure 56:
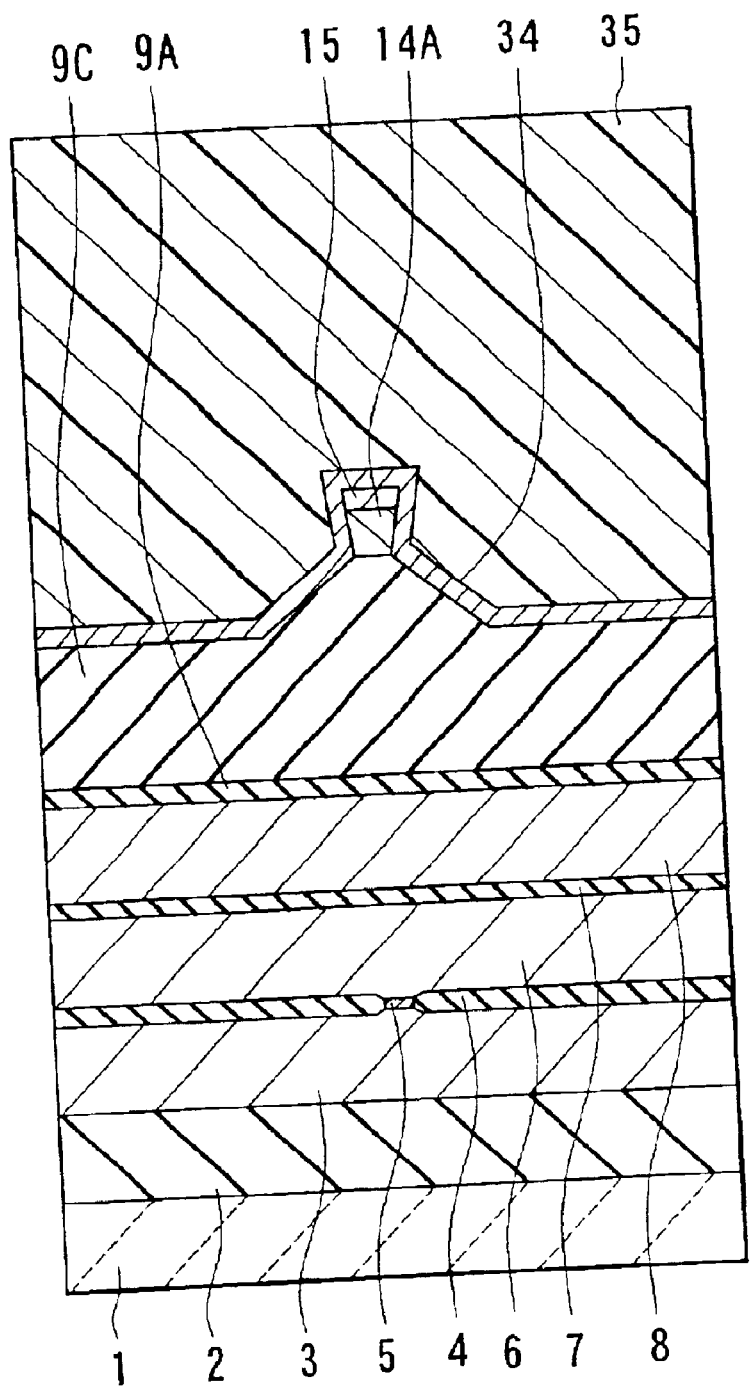
FIG. 56 is a cross-sectional view illustrating a step of a method of manufacturing a thin-film magnetic head in which no protective layer is provided.
Figure 57:
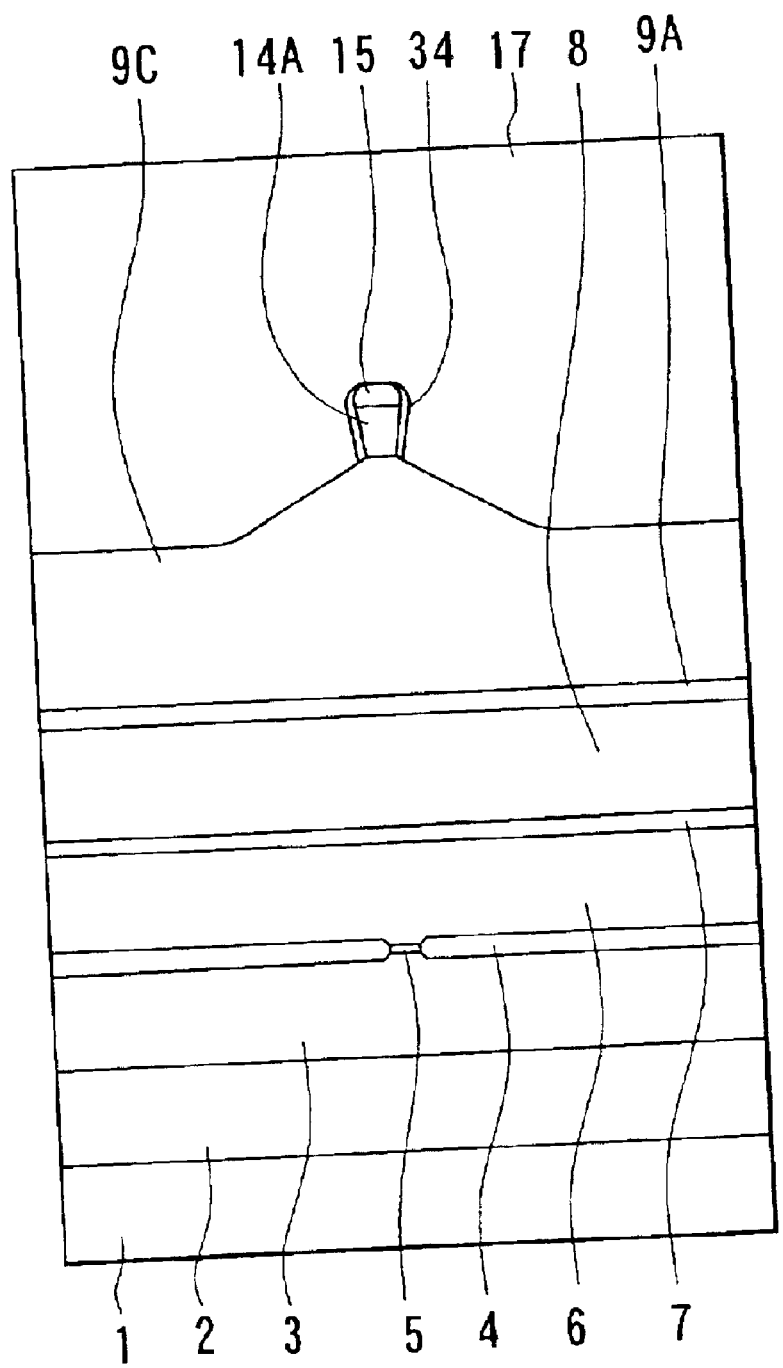
FIG. 57 is a front view illustrating a medium facing surface of the thin-film magnetic head obtained in the case where no protective layer is provided.

Now, referring to FIGS. 55 to 57, described below are advantageous effects provided by forming the protective layer 33 to cover a part of the pole portion layer 14A located near the medium facing surface ABS before the electrode layer 34 is formed in the present embodiment. FIG. 55 illustrates a step of the method of manufacturing the thin-film magnetic head according to the embodiment, showing a cross section of the medium facing surface ABS in the state shown in FIG. 45. FIG. 56 illustrates a step of the method of manufacturing a thin-film magnetic head in which no protective layer 33 is provided, showing a cross section of the medium facing surface ABS in the same state as shown in FIG. 55.

As shown in FIG. 56, where the protective layer 33 is not provided, in the vicinity of the medium facing surface ABS the electrode layer 34 is formed so as to cover the top surface of the non-magnetic layer 15 and both side surfaces of the pole portion layer 14A. An unnecessary portion of the electrode layer 34 is removed after the yoke portion layer 14B has been formed. At this time, the non-magnetic layer 15 may be deformed and, in some cases, the pole portion layer 14A may also be deformed or damaged, resulting in a degradation in property. Furthermore, it is difficult to remove the electrode layer 34 formed on the side surfaces of the pole portion layer 14A, and thus the electrode layer 34 is apt to remain on the side surfaces of the pole portion layer 14A. In particular, as shown in FIG. 56, in the case where the surface of the pole portion layer 14A exposed in the medium facing surface ABS has a shape of a trapezoid in which the lower side is shorter than the upper side, it is extremely difficult to remove the electrode layer 34 formed on the side surfaces of the pole portion layer 14A. For this reason, the medium facing surface ABS of the resulting thin-film magnetic head looks like the one shown in FIG. 57. If part of the electrode layer 34 remains on the side surfaces of the pole portion layer 14A as shown in FIG. 57, magnetic flux will flow into the recording medium from this part of the electrode layer 34, too. This causes an increase in the effective track width, which makes it difficult to reduce the track width.

In contrast, in the present embodiment, as shown in FIG. 55 the protective layer 33 is formed before forming the electrode layer 34, so as to cover a part of the pole portion layer 14A located near the medium facing surface ABS. This makes it possible to prevent the pole portion layer 14A from being deformed or damaged when removing the unnecessary portion of the electrode layer 34 after the yoke portion layer 14B has been formed, and to prevent an increase in the effective track width due to the electrode layer 34. According to the embodiment, it is also possible to form a good track profile because the electrode layer 34 that would cause the leakage of magnetic flux is not present on both sides of the pole portion layer 14A in the medium facing surface ABS.

When the width of the pole portion layer 14A measured in the medium facing surface ABS is 0.3 µm or less, in particular, removing the electrode layer 34 formed on the side surfaces of the pole portion layer 14A by dry etching as in the comparative example would result in great variations in width and shape of the pole portion layer 14A. In contrast, according to the present embodiment, the electrode layer 34 is not formed on the side surfaces of the pole portion layer 14A near the medium facing surface ABS, and therefore no variations in width and shape of the pole portion layer 14A would result from removal of the electrode layer 34.

Figure 58:
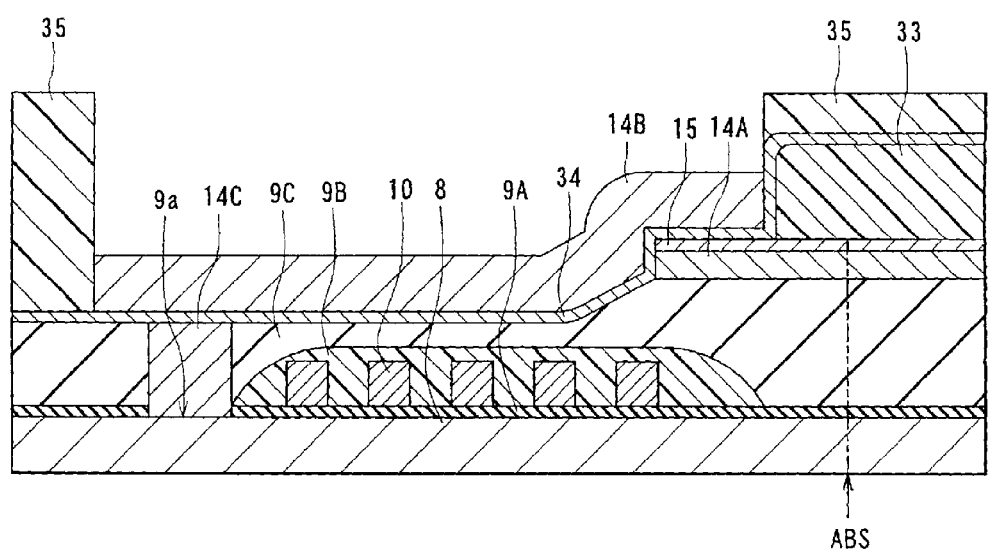
FIG. 58 is a cross-sectional view illustrating a step of a method of manufacturing a thin-film magnetic head of a modified example of the third embodiment of the invention.

In the present embodiment, as shown in FIG. 58, the protective layer 33 may define the position of the end of the yoke portion layer 14B closer to the medium facing surface ABS. FIG. 58 is a cross-sectional view illustrating the same step as that shown in FIG. 46. In the step shown in FIG. 58, the end of the protective layer 33 closer to the yoke portion layer 14B is disposed to oppose to the end of the yoke portion layer 14B closer to the medium facing surface ABS via the electrode layer 34. In the step shown in FIG. 58, the protective layer 33 is formed such that at least a part of the end thereof closer to the yoke portion layer 14B, the part opposing to the end of the yoke portion layer 14B closer to the medium facing surface ABS, forms a surface perpendicular to the surface of the substrate.

As shown in FIG. 58, when the protective layer 33 is utilized to define the position of the end of the yoke portion layer 14B closer to the medium facing surface ABS, the position of the end of the yoke portion layer 14B closer to the medium facing surface ABS can be defined more accurately as compared with the case where the end of the yoke portion layer 14B closer to the medium facing surface ABS is defined using the frame 35. The reason for this is as described in the first embodiment.

In the present embodiment, the step of forming the pole portion layer 14A includes the steps of: forming the layer 14Ae to be etched, made of a material for forming the pole portion layer 14A, on the gap layer 9 and the coupling portion 14C; and defining the outer shape of the pole portion layer 14A and exposing the coupling portion 14C by selectively etching the layer 14Ae by dry etching. In the present embodiment, the layer 14Ae is etched by dry etching, so as to define the shape of the base of the yoke portion layer 14B such that the base has a gentle slope from the rear end surface of the pole portion layer 14A to the upper end of the coupling portion 14C. Accordingly, by forming the yoke portion layer 14B on this base, it is possible to form the magnetic path that connects the coupling portion 14C and the pole portion layer 14A in the shortest distance.

The remainder of the structure, functions and effects of the present embodiment are similar to those of the first embodiment.

[Fourth Embodiment]

Figure 59:
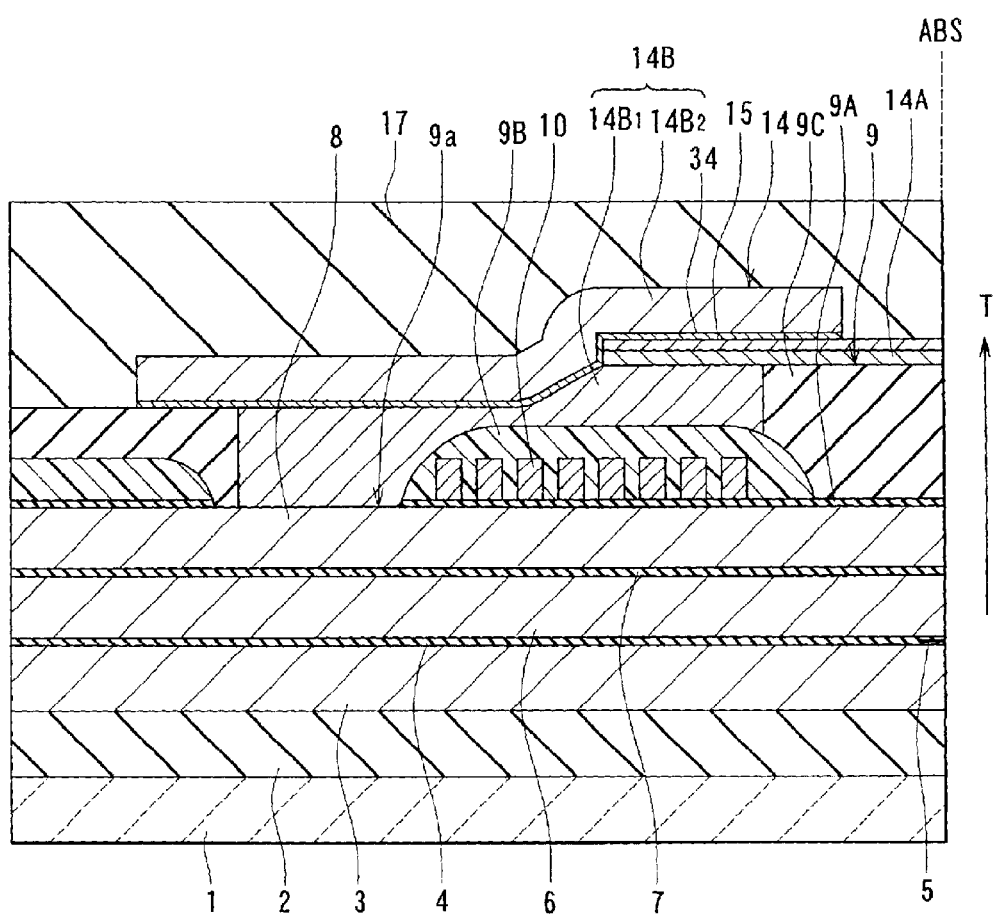
FIG. 59 is a cross-sectional view illustrating a structure of a thin-film magnetic head in a fourth embodiment of the invention.

Now, a method of manufacturing a thin-film magnetic head according to a fourth embodiment of the invention is described below. To begin with, referring to FIG. 59, explained is the structure of a thin-film magnetic head to which the method of manufacturing the thin-film magnetic head according to this embodiment is applied. The thin-film magnetic head in this embodiment is suitable for use with the vertical magnetic recording scheme as in the third embodiment. FIG. 59 is a cross-sectional view illustrating the structure of the thin-film magnetic head in this embodiment. FIG. 59 shows a cross section orthogonal to the medium facing surface and the surface of the substrate. The arrow indicated by symbol T in FIG. 59 shows the traveling direction of a recording medium.

The thin-film magnetic head in this embodiment is different from the head in the third embodiment in structure of the second magnetic layer 14. In this embodiment, the second magnetic layer 14 has the pole portion layer 14A and the yoke portion layer 14B but does not have the coupling portion 14C of the head in the third embodiment. The yoke portion layer 14B magnetically couples the pole portion layer 14A and the first magnetic layer 8 to each other. The yoke portion layer 14B includes: a first layer $14B_1$ that is in contact with and magnetically connected to the first magnetic layer 8 and a surface of the pole portion layer 14A closer to the gap layer 9; and a second layer $14B_2$ that is in contact with and magnetically connected to the first layer $14B_1$, the rear end surface of the pole portion layer 14A and both side surfaces of the pole portion layer 14A in the width direction.

The first layer $14B_1$ of the yoke portion layer 14B is formed on the first magnetic layer 8 and the insulating layer 9B to extend from where the contact hole 9a is formed toward the medium facing surface ABS, to the end surface of the insulating layer 9C farther from the medium facing surface ABS. The thickness of the first layer $14B_1$ at the position of the contact hole 9a is greater than the total thickness of the insulating layers 9A and 9B, and is equal to or greater than 3 μm, for example. For example, the end of the first layer $14B_1$ closer to the medium facing surface ABS is located at a distance of 1.5 μm or more from the medium facing surface ABS, and thus located closer to the medium facing surface ABS than the rear end surface of the pole portion layer 14A. The first layer $14B_1$ may be made of an iron-nickel-based alloy or Permalloy, or a high saturated magnetic flux density material.

The top surfaces of part of the first layer $14B_1$ of the yoke portion layer 14B located near the medium facing surface ABS and the insulating layer 9C are flattened. The pole portion layer 14A is formed on the flattened top surfaces of the first layer $14B_1$ and the insulating layer 9C. Accordingly, the first layer $14B_1$ of the yoke portion layer 14B is in contact with and magnetically connected to part of the surface of the pole portion layer 14A closer to the gap layer 9.

The second layer $14B_2$ of the yoke portion layer 14B is disposed on the first layer $14B_1$ and the non-magnetic layer 15. The second layer $14B_2$ is in contact with and magnetically connected to the first layer $14B_1$, the rear end surface of the pole portion layer 14A, and both side surfaces of the pole portion layer 14A in the width direction. Part of the second layer $14B_2$ located near the medium facing surface ABS is adjacent to the top surface of the pole portion layer 14A via the non-magnetic layer 15, and magnetically connected to the pole portion layer 14A via the non-magnetic layer 15. For example, the second layer $14B_2$ of the yoke portion layer 14B is 0.5 to 2 μm in thickness. For example, the second layer $14B_2$ may be made of an iron-nickel-based alloy or Permalloy, or a high saturated magnetic flux density material.

The remainder of the structure of the thin-film magnetic head of the present embodiment is the same as that of the third embodiment.

Figure 60:
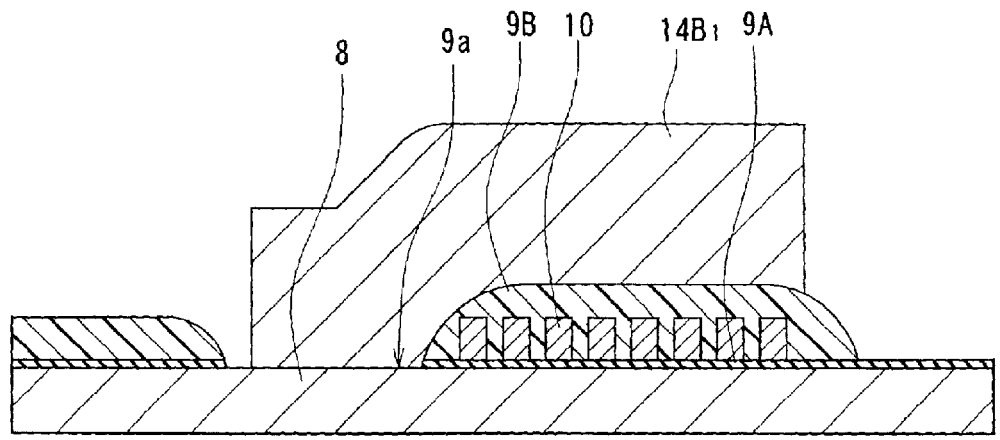
FIG. 60 is a cross-sectional view illustrating a step of a method of manufacturing the thin-film magnetic head according to the fourth embodiment of the invention.

Now, referring to FIGS. 60 to 64, the method of manufacturing the thin-film magnetic head according to the present embodiment is explained below. In FIGS. 60 to 64, the substrate 1 to the non-magnetic layer 7 are not shown. The method of manufacturing the thin-film magnetic head according to the present embodiment employs the same steps as those of the third embodiment up to the step of forming the insulating layer 9B, as shown in FIG. 60.

Then, in the present embodiment, with a well-known photolithography technique and a well-known deposition technique (e.g., electroplating), the first layer $14B_1$ of the yoke portion layer 14B is formed on the first magnetic layer 8 and the insulating layer 9B to extend from where the contact hole 9a is formed to a predetermined position towards the medium facing surface ABS. At this stage, for example, the first layer $14B_1$ has a thickness of 3 μm or more, a depth (or the length perpendicular to the medium facing surface ABS) of 2 to 10 μm, and a width of 5 to 20 μm.

Figure 61:
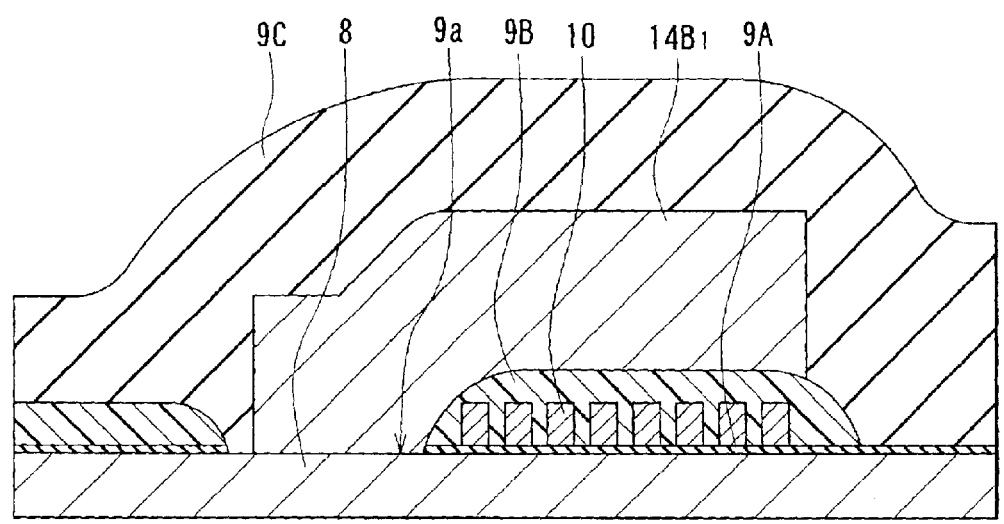
FIG. 61 is a cross-sectional view illustrating a step that follows FIG. 60.

Then, as shown in FIG. 61, the insulating layer 9C is formed by sputtering, so as to cover the insulating layer 9A, the insulating layer 9B, and the first layer $14B_1$ of the yoke portion layer 14B. At this stage, the insulating layer 9C has a thickness equal to or greater than that of the first layer $14B_1$.

Figure 62:
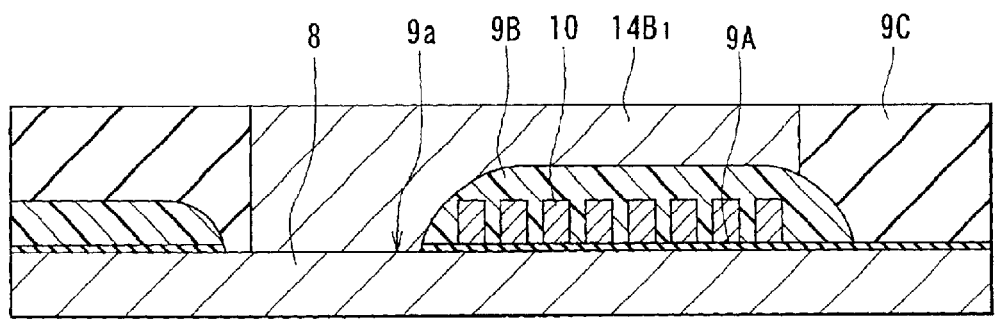
FIG. 62 is a cross-sectional view illustrating a step that follows FIG. 61.

Then, as shown in FIG. 62, the surface of the insulating layer 9C is polished by chemical mechanical polishing, for example, so that the first layer $14B_1$ of the yoke portion layer 14B is exposed, and the top surfaces of the insulating layer 9C and the first layer $14B_1$ are flattened. At this stage, the distance from the top surface of the first magnetic layer 8 to the top surface of the insulating layer 9C is 3 to 6 μm, for example.

Figure 63:
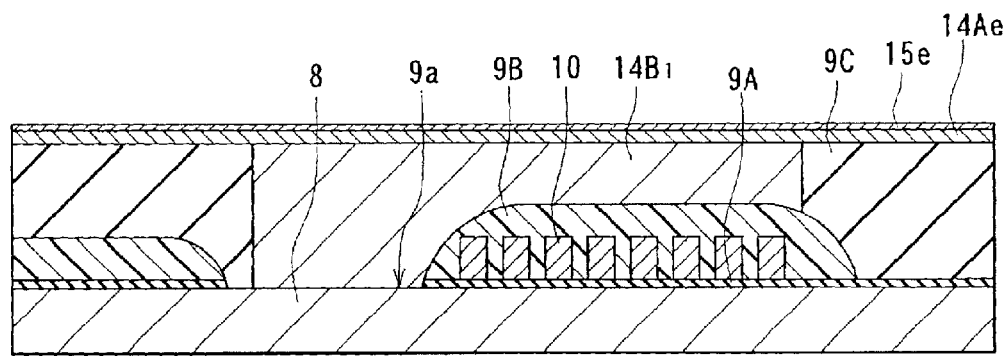
FIG. 63 is a cross-sectional view illustrating a step that follows FIG. 62.

Then, as shown in FIG. 63, the layer 14Ae to be etched and the non-magnetic layer 15e, which are the same as those in the third embodiment, are each formed on the insulating layer 9C and the first layer $14B_1$.

Figure 64:
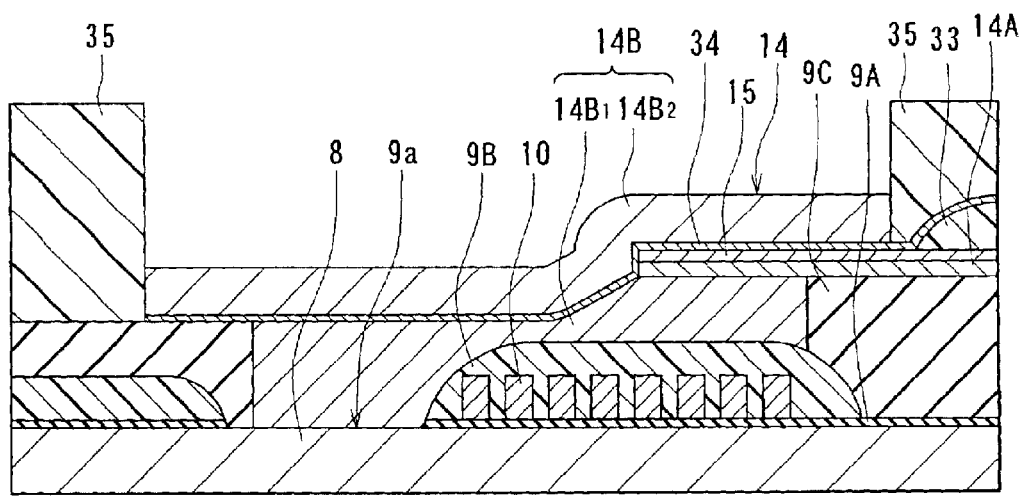
FIG. 64 is a cross-sectional view illustrating a step that follows FIG. 63.

The subsequent steps of this embodiment are the same as those of the third embodiment shown in FIGS. 42 to 49. That is, the non-magnetic layer 15e and the layer 14Ae are etched to define the outer shapes of the non-magnetic layer 15 and the pole portion layer 14A. Thereafter, the protective layer 33 is formed so as to cover part of the pole portion layer 14A and the non-magnetic layer 15 located near the medium facing surface ABS. Then, the electrode layer 34 and the frame 35 are formed in this order. Subsequently, as shown in FIG. 64, the yoke portion layer 14B is formed through electroplating (or frame plating), using the frame 35, on the electrode layer 34. The frame 35 is then stripped off to remove an unnecessary portion of the electrode layer 34 and the protective layer 33. Then, as shown in FIG. 59, the protective layer 17 is formed so as to cover the second magnetic layer 14. Then, through the steps of forming leads, terminals and the like on the protective layer 17, cutting the substrate for each slider, polishing the medium facing surface ABS, preparing rails for flying and so on, the thin-film magnetic head is completed.

The remainder of the structure, functions and effects of the present embodiment are similar to those of the first embodiment.

The present invention is not limited to the foregoing embodiments but may be practiced in still other ways. In the third and fourth embodiments, for example, the yoke portion layer 14B is magnetically connected to the top surface and rear end surface of the pole portion layer 14A, and both side surfaces of the pole portion layer 14A in the width direction. However, the yoke portion layer 14B may be magnetically connected only either the rear end surface of the pole portion layer 14A or the side surfaces thereof in the width direction.

Figure 65:
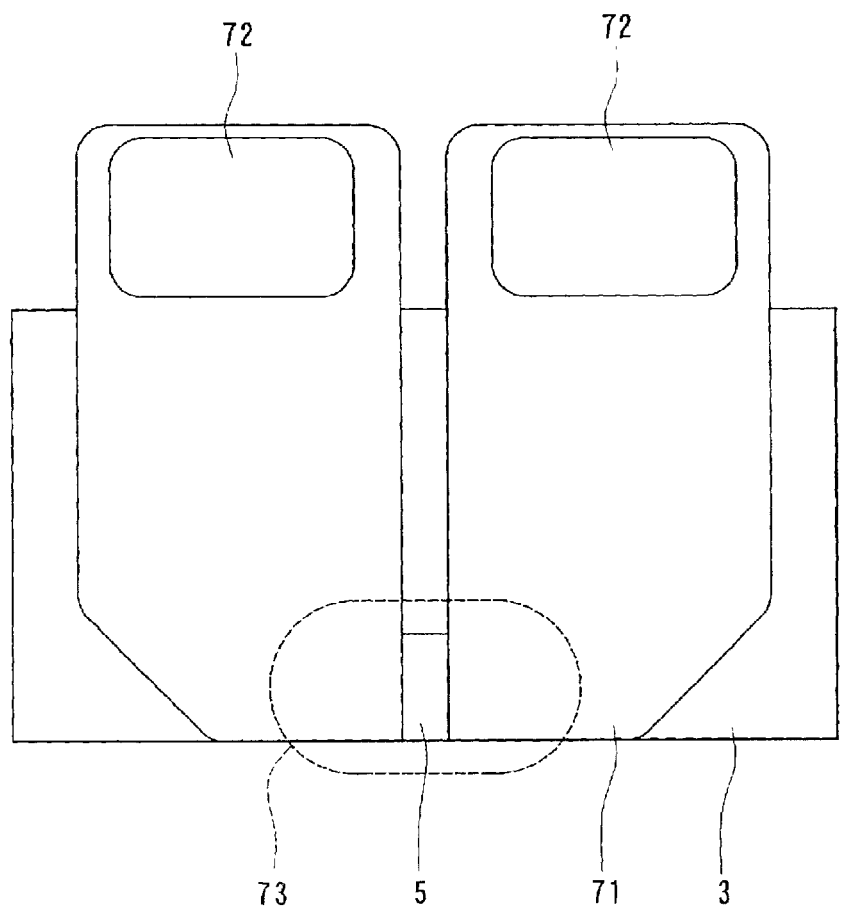
FIG. 65 is a plan view illustrating a portion around an MR element formed through application of the technique of the invention.

The technique of the invention is applicable not only to the case of forming the yoke portion layer by electroplating but also to the case of forming other layers by electroplating. For example, suppose that an MR element is formed and then a lead layer to be connected to the MR element is formed through electroplating. In this case, it is conceivable to form a protective layer so as to cover at least a part of the MR element before an electrode layer for plating is formed. This example is discussed below with reference to FIG. 65. FIG. 65 is a plan view illustrating the vicinity of the MR element 5. In this example, the MR element 5 is formed on the bottom shield layer 3 via the insulating layer 4. After the MR element 5 has been formed, two first lead layers 71 are formed which also serve as a bias magnetic field application layer for applying a bias magnetic field to the MR element 5. One end of each of the first lead layers 71 is connected to the MR element 5. After the first lead layers 71 have been formed, second lead layers 72 are formed through electroplating near the other end of each of the first lead layers 71, respectively. The layers 72 are each made of copper, for example. If a protective layer 73 is formed so as to cover the MR element 5 before forming the electrode layer to be used for forming the second lead layers 72 by electroplating, it is possible to prevent the MR element 5 from being deformed or damaged when removing an unnecessary portion of the electrode layer after the second lead layers 72 have been formed.

Similarly, in the case of forming a lead layer to be connected to a thin-film coil through electroplating after the thin-film coil has been formed, it is conceivable to form a protective layer so as to cover at least part of the thin-film coil before forming the electrode layer for plating. This makes it possible to prevent the thin-film coil from being deformed or damaged when removing an unnecessary portion of the electrode layer after the lead layer has been formed.

As described above, in the method of manufacturing a thin-film magnetic head according to the invention, the protective layer is formed so as to cover a part of the pole portion layer, the part being located near the one end of the pole portion layer, before forming the electrode layer to be used as an electrode when forming the yoke portion layer by electroplating. Accordingly, the invention makes it possible to prevent the pole portion layer from being deformed or damaged when removing an unnecessary portion of the electrode layer after the yoke portion layer has been formed, and to prevent an increase in the effective track width due to the electrode layer.

In the method of manufacturing a thin-film magnetic head of the invention, the protective layer may be formed of a photosensitive resist. In this case, it is possible to easily remove the protective layer.

In the method of manufacturing a thin-film magnetic head of the invention, at an interface between the protective layer and a base of the protective layer, a plane that is in contact with the surface of the protective layer may form an acute angle with a top surface of the base. In this case, it is possible to prevent burrs from developing when removing the unnecessary portion of the electrode layer.

In the method of manufacturing a thin-film magnetic head of the invention, the protective layer may have blunt edges. In this case, it is possible to easily remove the electrode layer formed on the protective layer.

In the method of manufacturing a thin-film magnetic head of the invention, the protective layer may define a position of an end of the yoke portion layer closer to the medium facing surface. In this case, it is possible to accurately define the position of the end of the yoke portion layer closer to the medium facing surface.

Obviously many modifications and variations of the present invention are possible in the light of the above teachings. It is therefore to be understood that within the range of equivalency of the appended claims the present invention may be carried out otherwise than as specifically described.

What is claimed is:

1. A method of manufacturing a thin-film magnetic head comprising: a medium facing surface that faces toward a recording medium; a coil that generates a magnetic field associated with information to be written on the recording medium; and a magnetic layer that defines a track width, allows a magnetic flux to pass therethrough, the magnetic flux corresponding to the magnetic field generated by the coil, and generates a magnetic field for writing the information on the recording medium, wherein the magnetic layer has: a pole portion layer that has one end exposed in the medium facing surface and generates the magnetic field for writing the information on the recording medium from the one end, the width of the one end defining the track width; and a yoke portion layer that is not exposed in the medium facing surface, is magnetically connected to the pole portion layer and introduces the magnetic flux corresponding to the magnetic field generated by the coil into the pole portion layer, the method comprising the steps of:

forming the coil; and forming the magnetic layer, wherein the step of forming the magnetic layer includes the steps of:

forming the pole portion layer;

forming a protective layer so as to cover a part of the pole portion layer, the part being located near the one end;

forming an electrode layer to be used as an electrode when forming the yoke portion layer by electroplating, so as to cover the pole portion layer and the protective layer;

forming the yoke portion layer on the electrode layer by electroplating, using the electrode layer as the electrode; and removing an unnecessary portion of the electrode layer while the part of the pole portion layer located near the one end is covered with the protective layer.

2. A method of manufacturing a thin-film magnetic head according to claim 1, wherein the yoke portion layer is magnetically connected to the pole portion layer in a part of a top surface of the pole portion layer.

3. A method of manufacturing a thin-film magnetic head according to claim 2, wherein the step of forming the magnetic layer further includes, between the step of forming the pole portion layer and the step of forming the protective layer, the steps of:

forming a non-magnetic layer around the pole portion layer; and flattening at least the part of the top surface of the pole portion layer in which the yoke portion layer is magnetically connected to the pole portion layer, together with a top surface of the non-magnetic layer, by polishing the non-magnetic layer.

4. A method of manufacturing a thin-film magnetic head according to claim 1, wherein the yoke portion layer is magnetically connected to the pole portion layer at least in a part of: an end surface of the pole portion layer farther from the medium facing surface; and both side surfaces of the pole portion layer in the width direction.

5. A method of manufacturing a thin-film magnetic head according to claim 1, wherein the step of forming the magnetic layer further includes the step of removing the protective layer after the step of removing the unnecessary portion of the electrode layer.

6. A method of manufacturing a thin-film magnetic head according to claim 1, wherein the unnecessary portion of the electrode layer is removed by dry etching in the step of removing the unnecessary portion of the electrode layer.

7. A method of manufacturing a thin-film magnetic head according to claim 1, wherein the protective layer is formed of a photosensitive resist.

8. A method of manufacturing a thin-film magnetic head according to claim 1, wherein, at an outer edge of an interface between the protective layer and a base of the protective layer, an imaginary plane that is in contact with the surface of the protective layer farther from the base forms an acute angle with the interface.

9. A method of manufacturing a thin-film magnetic head according to claim 1, wherein the protective layer has blunt edges.

10. A method of manufacturing a thin-film magnetic head according to claim 1, wherein the protective layer defines a position of an end of the yoke portion layer closer to the medium facing surface.

* * * * *